Dec. 16, 1952

J. E. TOMPKINS 2,621,686

MACHINE TOOL WITH MOTOR-DRIVEN ROTARY AND AXIALLY FED TOOLS

Filed Dec. 11, 1946

INVENTOR.
John Everette Tompkins
BY Harry R. Canfield

ATTORNEY

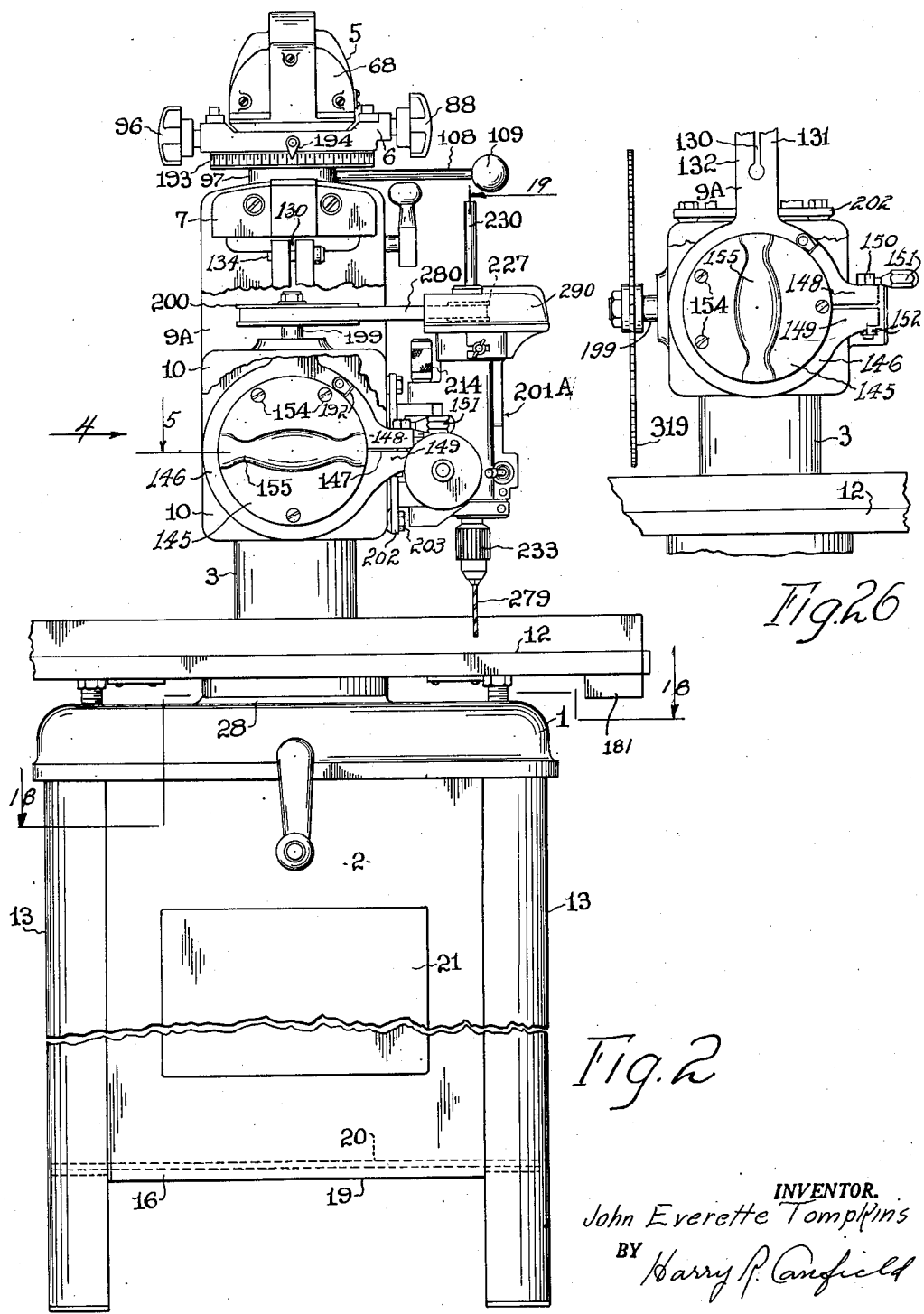

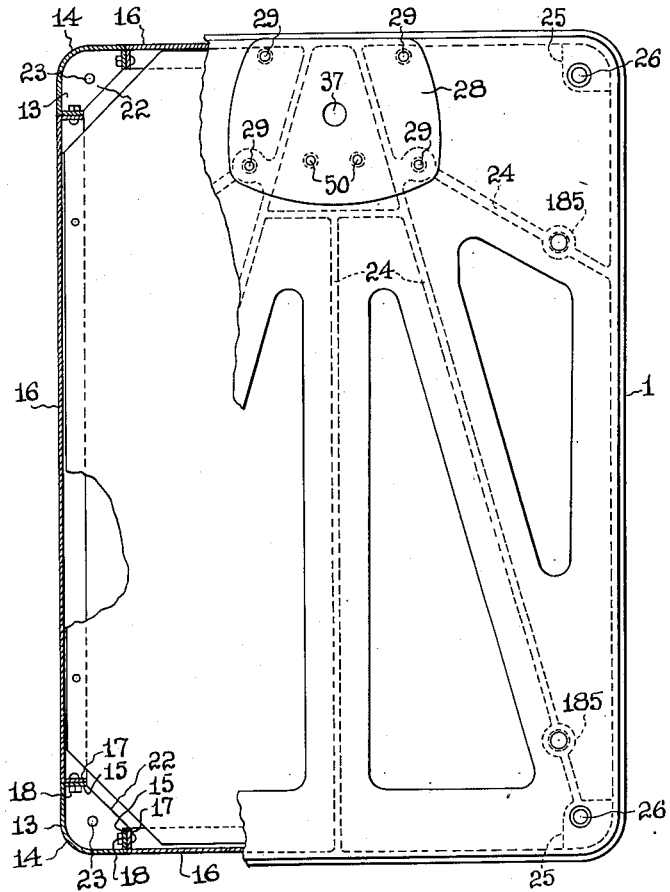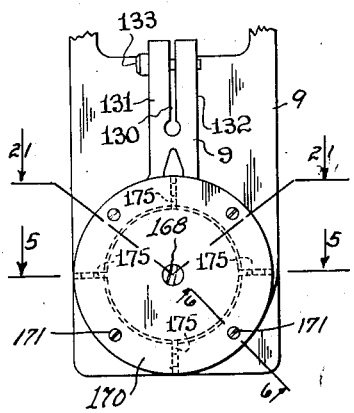

Dec. 16, 1952   J. E. TOMPKINS   2,621,686
MACHINE TOOL WITH MOTOR-DRIVEN
ROTARY AND AXIALLY FED TOOLS
Filed Dec. 11, 1946   13 Sheets-Sheet 4

INVENTOR.
John Everette Tompkins
BY Harry R. Canfield
ATTORNEY.

Dec. 16, 1952 J. E. TOMPKINS 2,621,686
MACHINE TOOL WITH MOTOR-DRIVEN
ROTARY AND AXIALLY FED TOOLS
Filed Dec. 11, 1946 13 Sheets-Sheet 5

INVENTOR.
John Everette Tompkins
BY Harry R Canfield
ATTORNEY

Dec. 16, 1952

J. E. TOMPKINS
MACHINE TOOL WITH MOTOR-DRIVEN
ROTARY AND AXIALLY FED TOOLS 2,621,686

Filed Dec. 11, 1946

INVENTOR.
John Everette Tompkins
BY Harry C. Canfield
ATTORNEY.

Dec. 16, 1952  
J. E. TOMPKINS  
MACHINE TOOL WITH MOTOR-DRIVEN ROTARY AND AXIALLY FED TOOLS  
2,621,686

Filed Dec. 11, 1946  
13 Sheets-Sheet 7

INVENTOR.  
John Everette Tompkins  
BY Harry P. Canfield  
ATTORNEY.

Dec. 16, 1952   J. E. TOMPKINS   2,621,686
MACHINE TOOL WITH MOTOR-DRIVEN
ROTARY AND AXIALLY FED TOOLS
Filed Dec. 11, 1946   13 Sheets-Sheet 8

INVENTOR.
John Everette Tompkins
BY Harry P. Canfield
ATTORNEY.

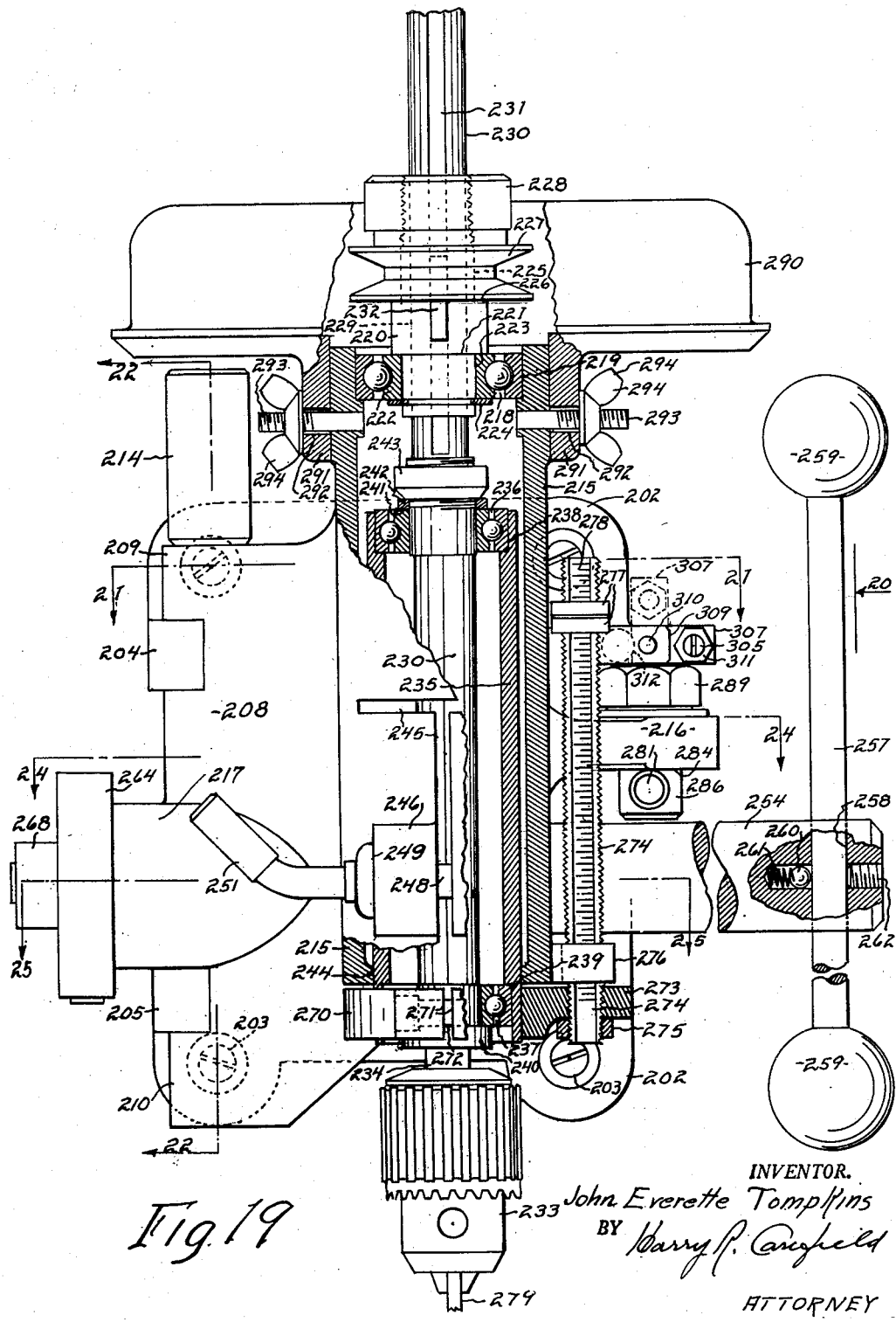

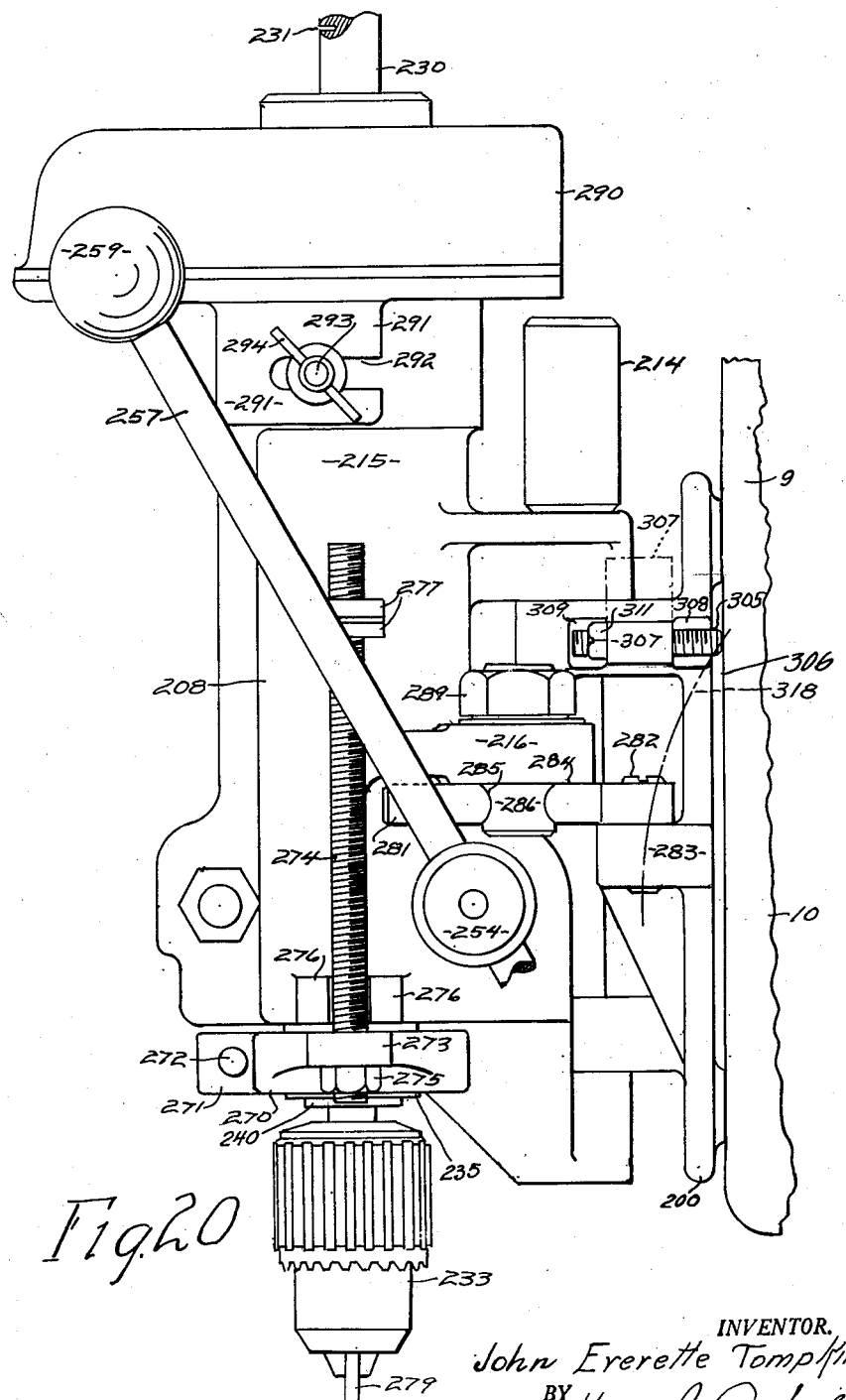

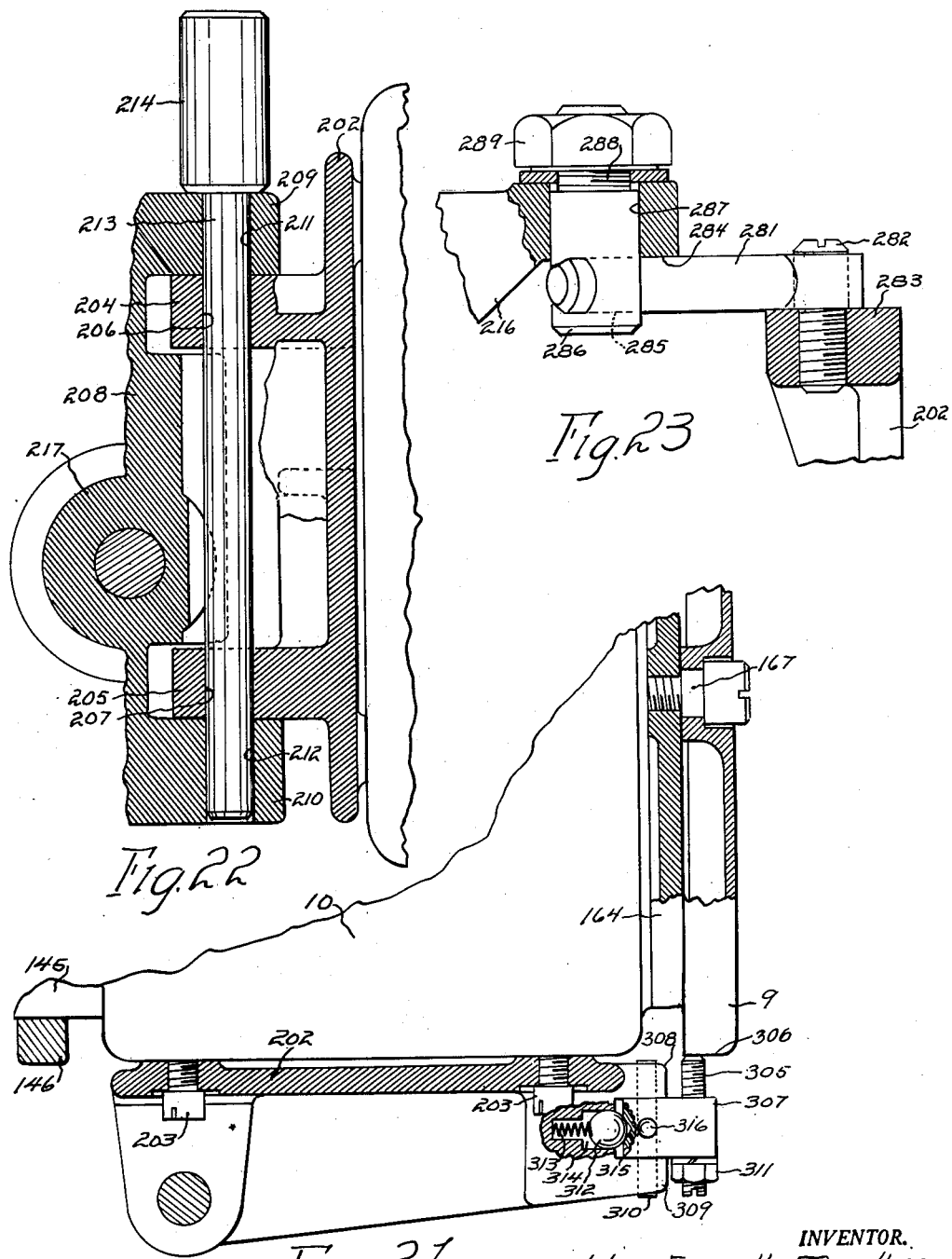

Dec. 16, 1952  J. E. TOMPKINS  2,621,686
MACHINE TOOL WITH MOTOR-DRIVEN
ROTARY AND AXIALLY FED TOOLS
Filed Dec. 11, 1946  13 Sheets-Sheet 12

INVENTOR.
John Everette Tompkins
BY Harry P. Canfield
ATTORNEY

Dec. 16, 1952   J. E. TOMPKINS   2,621,686
MACHINE TOOL WITH MOTOR-DRIVEN
ROTARY AND AXIALLY FED TOOLS
Filed Dec. 11, 1946   13 Sheets-Sheet 13

INVENTOR.
John Everette Tompkins
BY Harry P. Canfield
ATTORNEY

Patented Dec. 16, 1952

2,621,686

UNITED STATES PATENT OFFICE 2,621,686

MACHINE TOOL WITH MOTOR-DRIVEN ROTARY AND AXIALLY FED TOOLS

John Everette Tompkins, Cleveland, Ohio, assignor, by mesne assignments, of thirty one-hundredths to Ralph R. Roemer, thirty-five one-hundredths to Louise E. Roemer, twenty-five one-hundredths to William R. Kiefer, and ten one-hundredths to J. Everette Tompkins, all of Cleveland, Ohio Application December 11, 1946, Serial No. 715,442

8 Claims. (Cl. 144—103)

This invention relates to motor driven machine tools of the class in which the work performing tool per se is positionable and guidedly movable substantially universally, to perform a great variety of operations on work, and by which different types of working tools may be driven.

The machine is particularly applicable to wood working, but is not limited thereto as will become apparent hereinafter.

The machine embodying the invention comprises a motor having a tool driving shaft; and a rotary, axially movable, tool driving spindle mounted on the motor housing and driven by the motor shaft through a transmission. A machine structure supports the motor housing over a work table on which work is placed, and the machine structure comprises means for variably angularly positioning the motor housing to correspondingly position the tool driving motor shaft and the tool driving spindle, with respect to the work; and comprises guide means to guide manual movement of the motor housing to correspondingly guide movement of the tools.

To movably and adjustably support the motor housing as referred to I prefer to employ a machine structure of the type illustrated and described in the co-pending patent application of Carl F. Duerr, Serial Number 641,980, filed January 18, 1946, assigned to the assignees hereof. That machine has a motor housing bodily reciprocable manually along a trackway, which is supported by an arm overhanging a work table. The trackway is pivoted on the arm on a vertical axis for movement in a horizontal plane to different angular positions on the arm; and the axis of the pivot is movable along the arm to different positions. The arm can be raised and lowered. The motor and its shaft can be rocked to different angular positions on a trunnion axis at right angles to the shaft.

The work table has a fence against which work may be placed, or along which it may be guidedly moved.

In utilizing a machine structure of this type I detachably mount upon the motor housing a spindle unit-housing comprising a tool spindle manually reciprocable axially, and rotatably driven by a transmission from the motor shaft, the rotary axis of the spindle being substantially parallel to the motor shaft axis.

By this means as a whole, rotary tools such as circular saws, routers, profilers, etc. may be mounted on the motor shaft and rotary tools such as drills, reamers, profilers, sanders, planers, etc. may be mounted on the rotary spindle; and the tools in either case may be positioned and guidedly moved to perform a great variety of operations.

For example, when a circular saw is the tool, it can make cross cuts, bevel cuts, mitre cuts, rip cuts and combinations of the same; and when spindle driven tools are used they can perform drilling, reaming, profiling, routing, surface sanding, surface planing operations, etc., and three operations can be performed in all angular directions on horizontal, vertical, or angular surfaces of the work.

The invention is applicable to factory production work; and also has a large field of usefulness in the home work shops. Practically every ordinary woodworking operation can be performed by the machine with the possible exception of lathe turning operations, on work supported on centers.

In one aspect of the invention it is an improved motor powered machine tool, provided with means for mounting tools in two different places on the motor; in one case the tool being a rotary tool, driven directly by the motor shaft, and in the other case, the tool being a rotary-and-axially-movable tool, driven by the motor shaft through a power transmission; and the machine being provided with means to variably position the tools and to variably guide movement thereof, in both cases.

In another aspect of the invention, it is an improved machine tool having a universally positionable and guidedly movable motor housing; and provided with means to mount rotary tools to be driven by the motor shaft directly, and correspondingly positionable and movable with the motor housing; and provided with means to mount rotary-and-axially-reciprocable tools on the motor housing to be driven by the motor, and correspondingly positionable and movable with the motor housing.

In another aspect the invention is an improved motor driven machine tool comprising a tool spindle unit, having a rotary and axially-reciprocable tool spindle, and constructed to be readily mounted upon the housing of the motor and driven by the motor, or detached therefrom; and the housing of the motor being supported on the machine for universal positioning thereon and for universal guided manual movement thereon, to correspondingly position and guide tools on the tool spindle.

In another aspect the invention is an improved construction of tool spindle unit, comprising a rotary and axially movable tool spindle, and constructed to adapt it to be readily mounted on the housing of a motor and to be driven by the motor.

In prior practice, rotary and axially fed tools are exemplified by the conventional drill press. It comprises a power-rotated drill-carrying spindle, which may be fed axially to feed the drill into the work on a work table; and in some cases the axis of the drill spindle may be set vertically or horizontally or at intermediate angles; and in other cases, as in so-called radial drills, the drill spindle can be variably positioned along an overhanging horizontal radial arm, and the arm swung from side to side to variably position it over a work table.

The machine of the present invention, while having the advantage among others of being able to perform ordinary drilling and like operations, including all of those of the above mentioned type of radial drill press, can perform drilling operations not possible with any prior drill press machine of which I have knowledge among which are: the drilling of a row of holes along a line in any angular direction in a work piece on the work table, merely by shifting the spindle driving motor to different positions along the aforesaid trackway after setting the trackway to the appropriate angle; and the drilling of another row of holes parallel thereto, or spaced therefrom at an angle, after shifting the trackway axis along the arm; and the drilling of rows of holes in a common horizontal plane and in any direction by angularly positioning the trackway and positioning the motor along the trackway; and the drilling of other rows of holes in a common plane parallel to the aforesaid plane by raising and lowering the arm.

To drill such rows of holes, even with radial drill presses having all of the conventional adjustments such as identified above for such drill presses, the centers of the holes must first be laid out on the work; and then by a combination of successive or concurrent adjusting movements of the drill along the radial arm and of the swing of the arm (each of which adjustments changes the position of the drill effected by the other), the drill must be adjusted to bring it over each of the laid-out centers, one at a time, and with different multiple concurrent adjustments for each hole.

Again, in prior practice, rotary surfacing tools have been used for sanding or planing surfaces, and comprising cutting elements rotating in a plane at right angles to the rotary axis of the tool. In such practice, a large surface area can only be surfaced by a correspondingly large diameter tool calling for a machine made especially for this operation. With the machine of the present invention, a surface several square feet in area may all be reduced to a perfectly smooth plane by a rotary planar faced tool of only two or three inches in diameter. The tool is put on the tool spindle on the motor housing as aforesaid, and fed axially to a cutting position on the work; and then by means of the universal movement provided for the motor housing, the tool can be moved over a great area, working all of it to the plane of the tool face.

Again, in prior practice, a complete machine has been required to drive rotary tools, and another complete machine has been required to drive rotary-and-axially-reciprocable tools, when the tools are to universally positioned and moved with respect to the work. The present invention provides a single machine by which both classes of tools may be driven and universally positioned and moved; utilizing a single driving motor and a single tool positioning and tool guiding mechanism.

The actual invention, as to subject matter and scope, is set forth in the appended claims according to law; and the main object thereof is to provide a machine having features of construction and modes of operation some of which are referred to above.

Other objects will be apparent to those skilled in the art to which the invention appertains.

The invention is fully disclosed in the following description taken in connection with the accompanying drawing, in which:

Fig. 2 is a front elevational view of the machine of Fig. 1, with parts broken away;

Fig. 3 is a fragmentary elevational view taken in the direction of the arrow 3 of Fig. 1, showing a motor trunnion axis adjustment and with parts that would appear on the left side of the figure omitted for simplicity;

Figure 1:
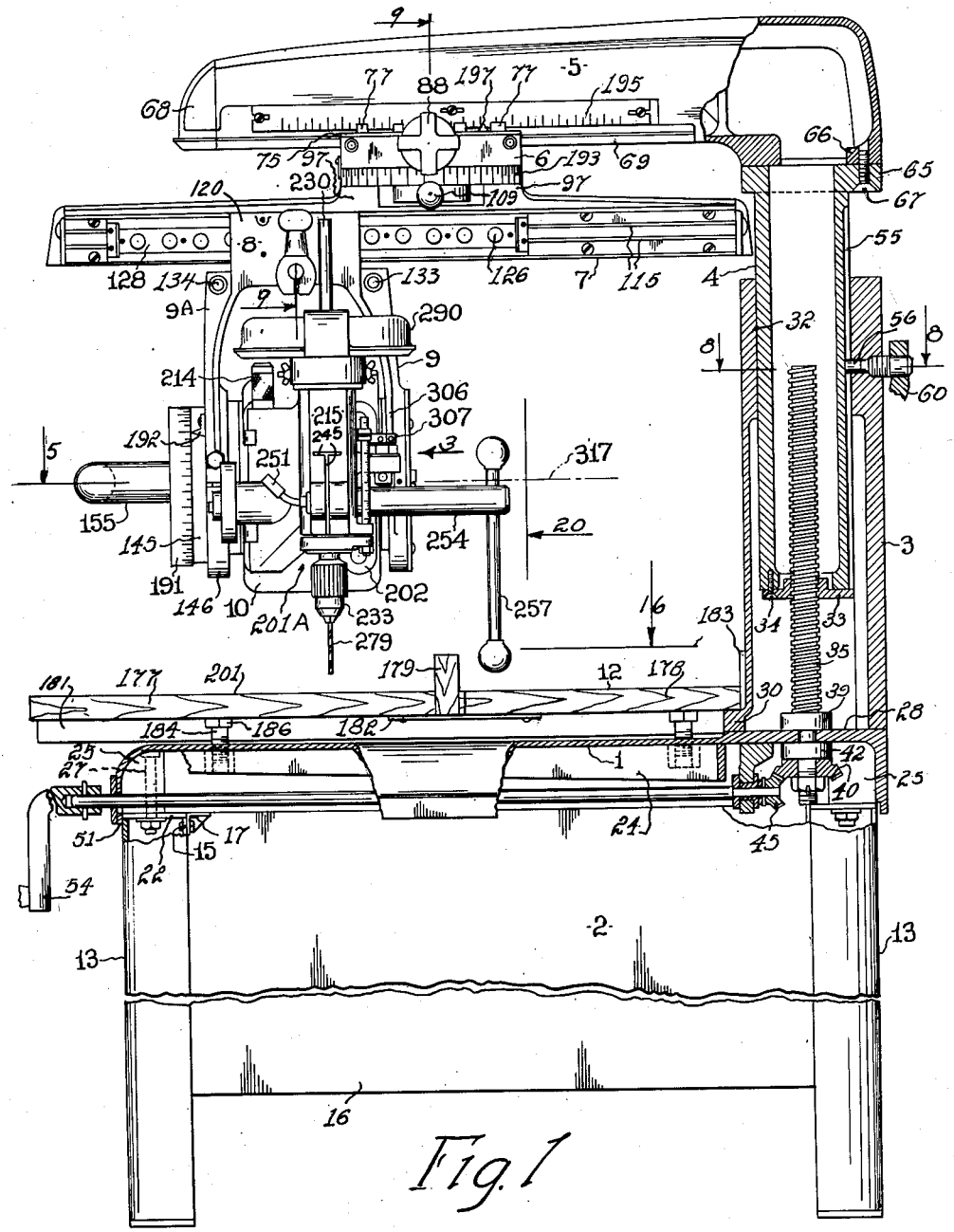
Fig. 1 is a side elevational view of a machine tool embodying the invention with parts broken away and parts in section.
Figures 5, 6:
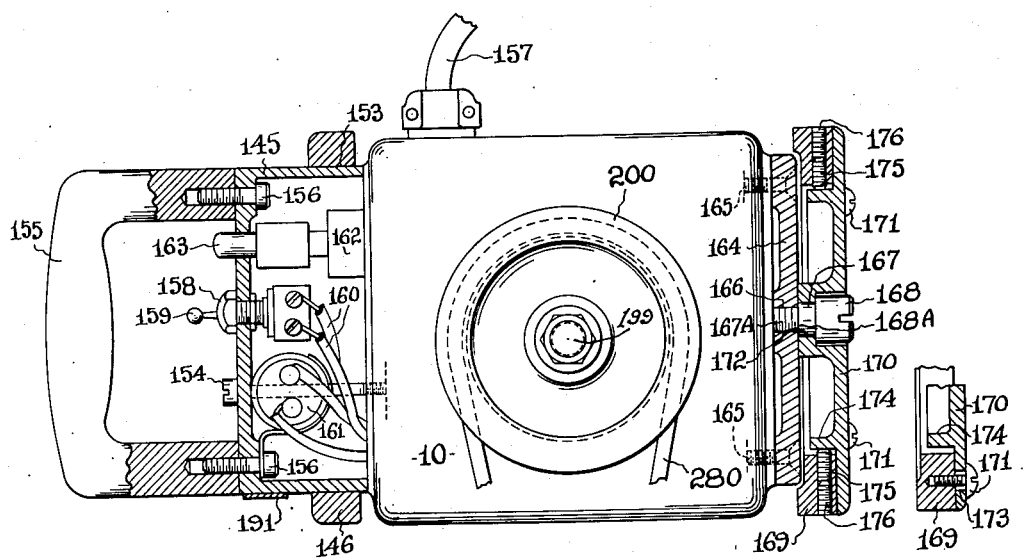
Figure 8:
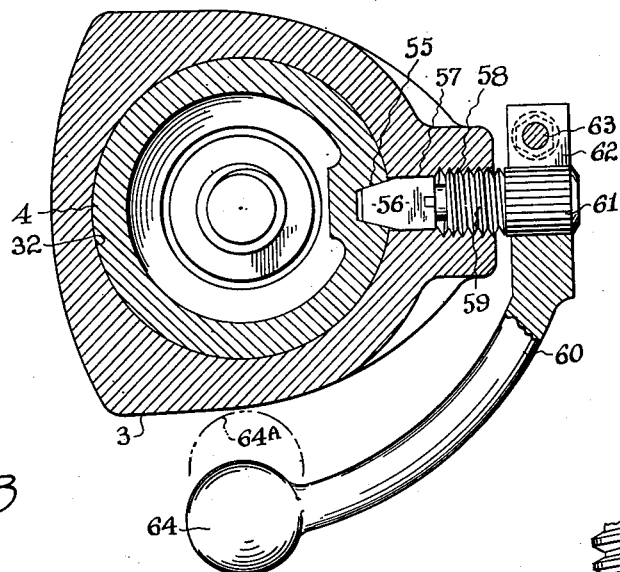
Figure 7:
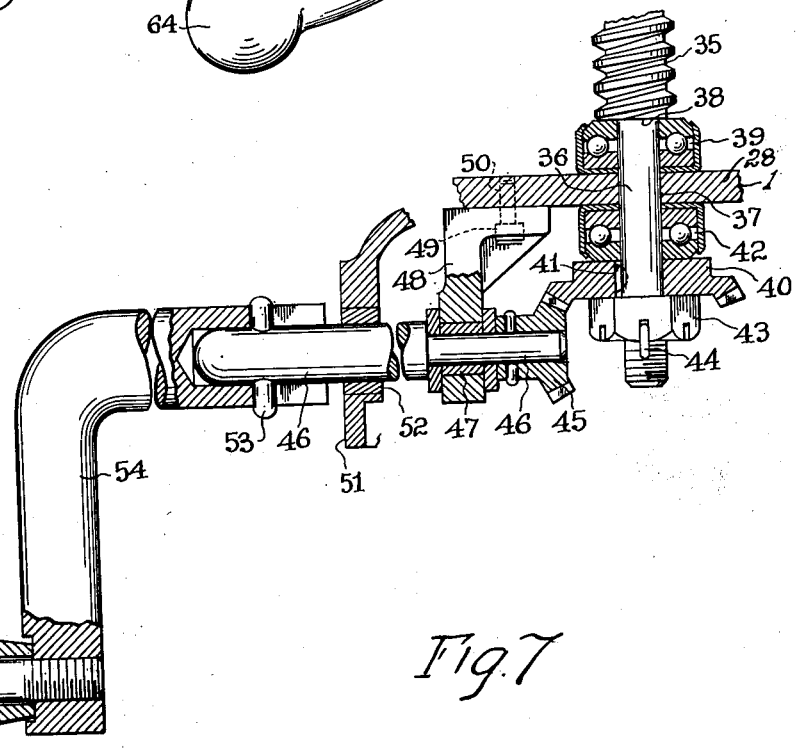
Figure 9:
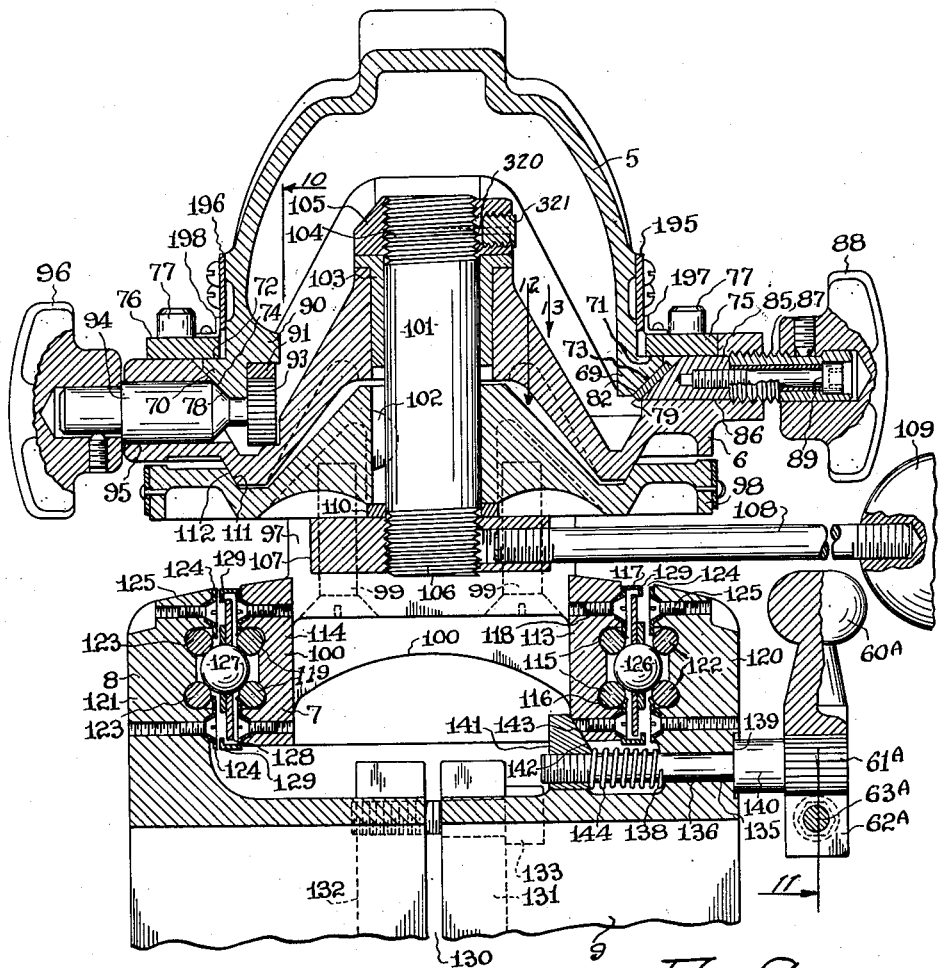
Figure 10:
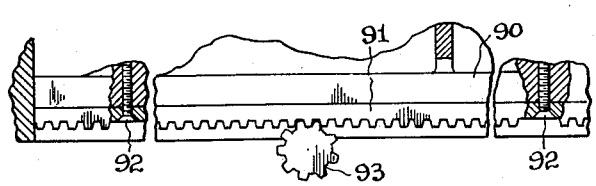
Figure 16:
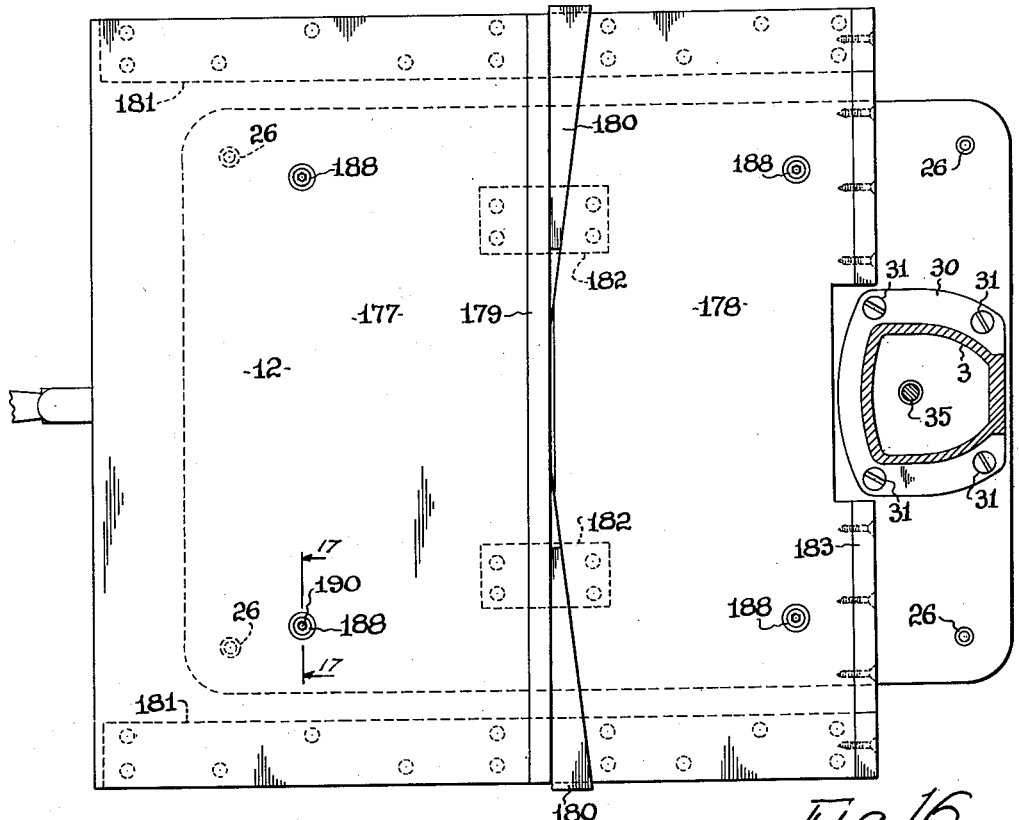
Figure 17:
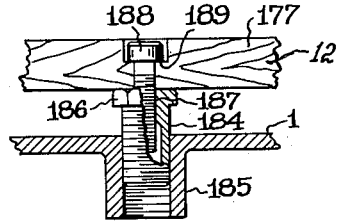
Figure 11:
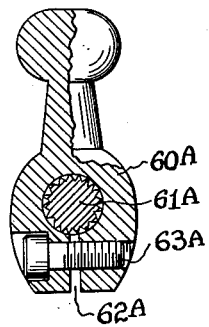
Figure 12:
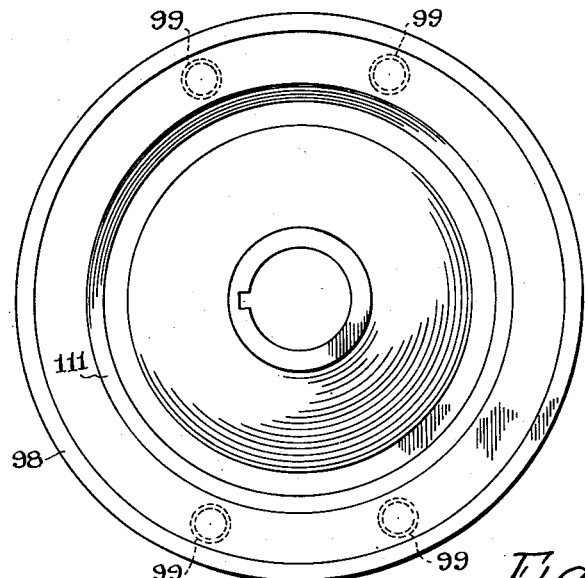
Figures 13, 14, 15:
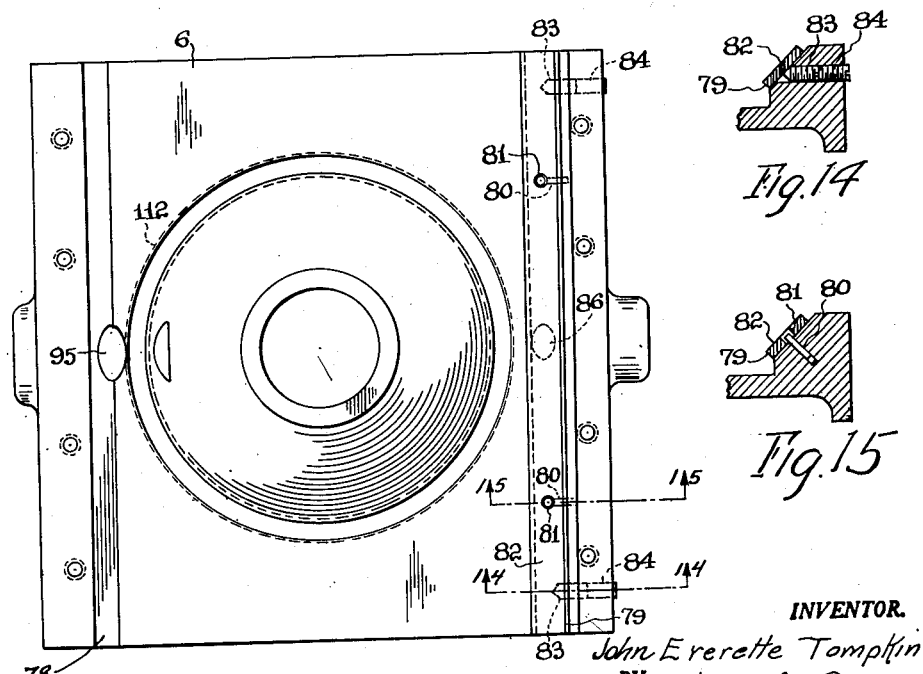
Figure 24:
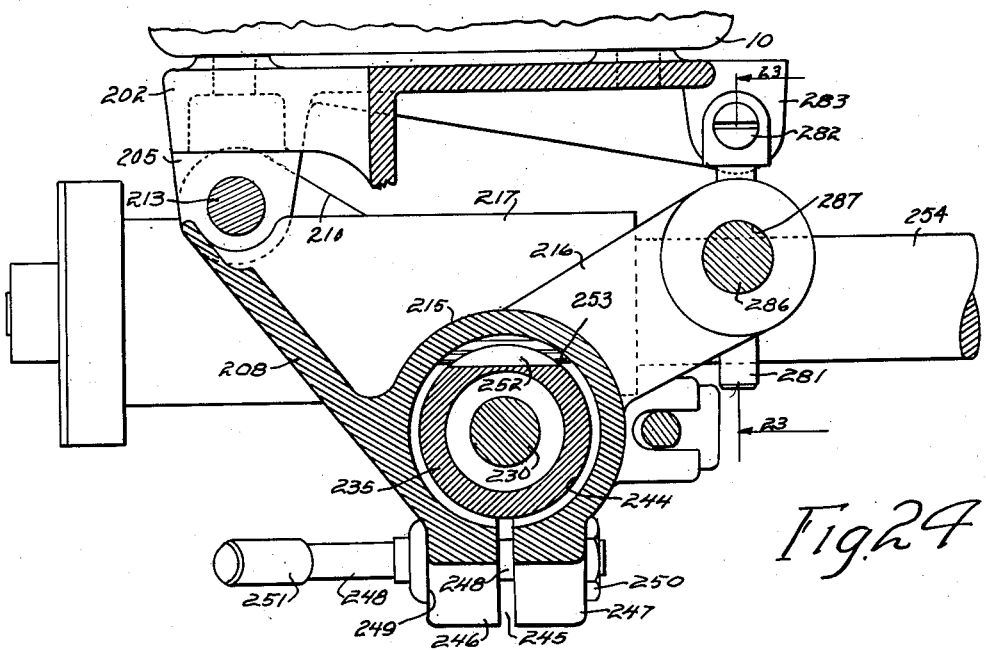
Figure 25:
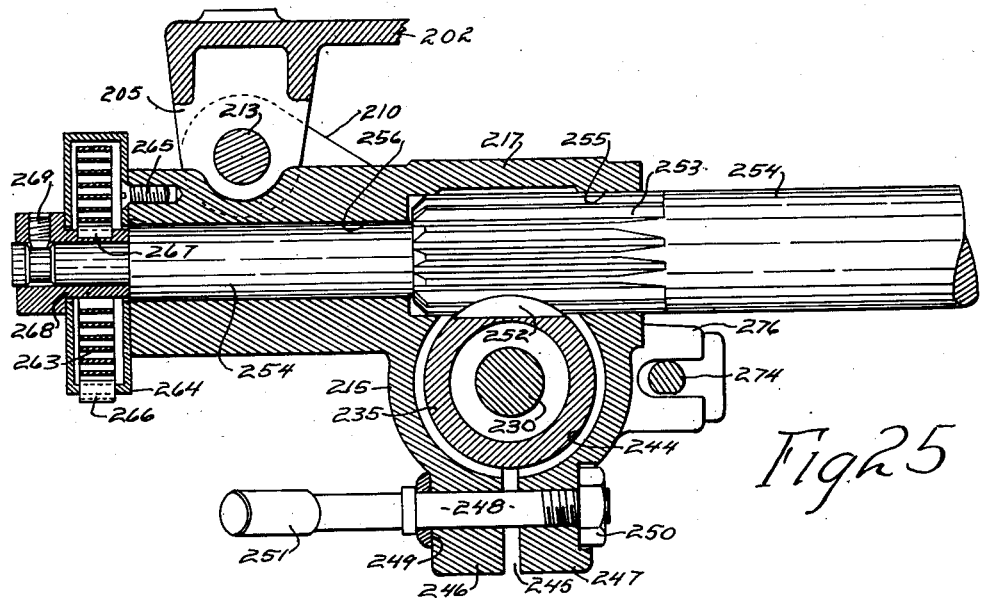
Figure 27:
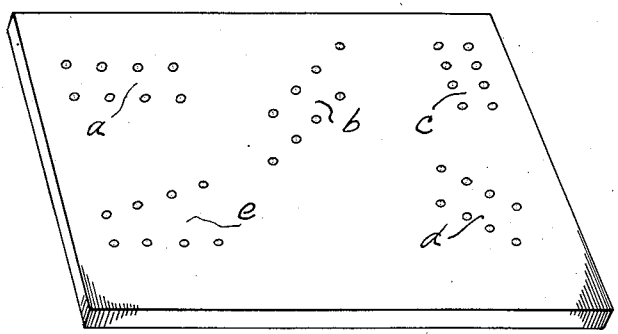
Figure 28:
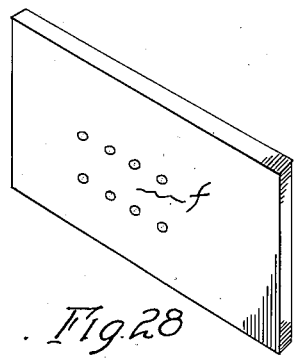
Figure 30:
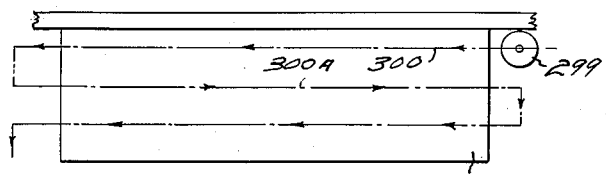
Figure 31:
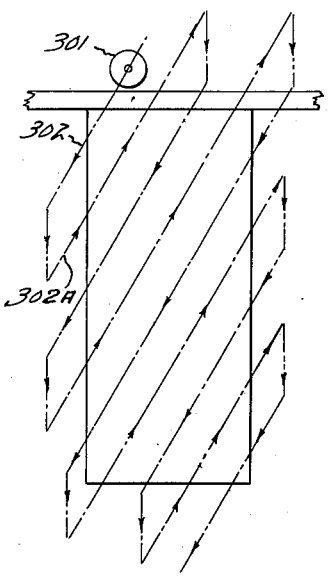
Figures 29, 32:
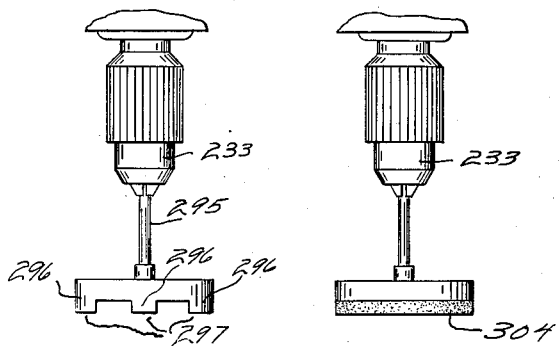

Fig. 5 is a view to enlarged scale from the plane 5 of Fig. 1, or from the plane 5 of Fig. 2 rotated through ninety degrees on the paper; and with parts which would appear on the lower side of Fig. 5 omitted for simplification; and the right hand end of Fig. 5 may be considered as from the plane 5—5 of Fig. 3;

Fig. 6 is a fragmentary view, similar to a part of the right hand end of Fig. 5, but taken on the plane 6—6 of Fig. 3;

Fig. 7 is a view to enlarged scale, with parts broken away, of a part of Fig. 1;

Fig. 8 is a sectional view to enlarged scale from the plane 8—8 of Fig. 1;

Fig. 9 is a sectional view from the plane 9—9 of Fig. 1;

Fig. 10 is a fragmentary view from the plane 10 of Fig. 9;

Fig. 11 is a fragmentary broken sectional view from the plane 11 of Fig. 9;

Fig. 12 is a top plan view of one of the parts of Fig. 9 taken in the direction of the arrow 12 of Fig. 9, and showing said part separately;

Fig. 13 is a top plan view of one of the parts of Fig. 9, taken in the direction of the arrow 13 of Fig. 9, and showing said part separately, but with a gib and its adjustment associated therewith;

Figs. 14 and 15 are fragmentary sectional views from the planes 14—14 and 15—15 of Fig. 13;

Fig. 16 is a top plan view of the work table top of the machine taken from the plane 16 of Fig. 1, with parts of the machine in section;

Fig. 17 is a fragmentary view to enlarged scale from the plane 17—17 of Fig. 16 showing a table top adjustment, the same being shown to smaller scale in Fig. 1;

Fig. 18 is a view showing in plan a part of a table base and supporting cabinet top and showing a part of the cabinet in section, the view being taken from the plane 18—18 of Fig. 2;

Fig. 19 is a view to enlarged scale from the plane 19 of Fig. 2, with parts in elevation and parts in section and other parts broken away; and with some of the parts behind the section plane omitted for simplicity;

Fig. 20 is an elevational view to enlarged scale from the plane 20 of Fig. 19, or Fig. 1 with parts broken away;

Fig. 21 is a sectional view, the lower part being taken from the plane 21—21 of Fig. 19; and the right hand part being taken from the plane 21—21 of Fig. 3, to a larger scale, to simplify the drawing;

Fig. 22 is a sectional view from the plane 22—22 of Fig. 19;

Fig. 23 is a fragmentary view to a larger scale from the plane 23—23 of Fig. 24;

Fig. 24 is a sectional view from the plane 24—24 of Fig. 19;

Fig. 25 is a sectional view from the plane 25—25 of Fig. 19;

Fig. 26 is a fragmentary view of a part of Fig. 2, with parts thereof rotated through 90° and with parts replacing some of the parts of Fig. 2;

Fig. 27 is a perspective view illustrating a board or like work piece which may be laid on a work table of the machine and illustrating rows of holes which may be drilled by a drill type tool of the machine;

Fig. 28 is a view similar to Fig. 27 but with the surface of the work piece vertically disposed;

Fig. 29 is a fragmentary view of a part of Fig. 1 illustrating a planing type tool that may be used;

Figs. 30 and 31 are somewhat diagrammatic views illustrating in plan a work piece upon which a planing operation may be performed by the tool of Fig. 29, and the path of the tool;

Fig. 32 is a view similar to Fig. 29 but illustrating a sanding type tool.

As mentioned hereinbefore the invention provides for mounting rotary-and-axially-reciprocable tools on a motor housing (exemplified by a drill type tool), and driving the tool by the motor and universally positioning and moving the housing, to position and move the tool; and provides for mounting rotary tools (exemplified by a circular saw) on the motor, and similarly positioning and moving it by positioning and moving the housing.

In the following, the machine generally and the means by which the motor housing is mounted for universal positioning and universal movement, will first be described, apart from either type of tool (to render the drawing simpler than otherwise in some respects); and this will be followed by a description for rotary-and-axially-movable type tools (drills); and finally will follow a description for tools of the simple rotary type (saws).

As shown in the elevational views, Figs. 1 and 2, the machine tool comprises in general a cast metal main base 1, mounted on the top of a sheet metal support 2 having the form of a cabinet; a column 3 mounted on the base 1; a stem 4 reciprocable vertically in the column 3; a generally horizontal arm 5 on the stem 4; a pivot head 6 adjustably positionable along the arm 5; a horizontal trackway 7 adjustably pivotable upon a vertical axis on the head 6; a carriage 8 operatively reciprocable along the trackway 7; hangers 9 and 9A on the carriage 8, supporting a motor 10; and a work table 12 supported on the base 1.

The constructional details of the parts referred to generally above, will now be described.

The main support 2 is generally rectangular in horizontal plane, and comprises four corner legs 13—13 formed by bending sheet metal to provide as at 14, Fig. 18, rounded external contours on the legs; the vertical inner edges of the legs thus formed being bent inwardly to provide flanges 15—15. Sheet metal walls or panels 16 at both ends and both sides of the support, are provided, having flanges 17 bolted to the flanges 15 of the legs by bolts 18, Fig. 18. The panels 16 may terminate downwardly as at 19 above the lower ends of the legs 13; and an interior shelf 20, Fig. 2, may be provided and supported in any suitable manner, whereby the interior of the support, enclosed by the legs and the side walls, may be used as a cabinet to contain tools, material to be worked, etc. To give access thereto a door 21 may be provided in one or more of the panels, and attached thereto for opening and closing in any suitable manner not essential to the invention.

Top plates 22—22, Figs. 1 and 18, are provided at the tops of the legs 13, and may be secured thereto by welding. Each of these plates is provided with a perforation 23.

The base 1, see Figs. 1, 2, and 18, is generally in the form of a downwardly open shallow cup or pan reinforced on its underside by ribs 24—24, and is generally rectangular in plan with rounded corners. In the corners are bosses 25 which rest upon the leg plates 22, and holes 26 are provided in the bosses, and bolts 27, Fig. 1, are projected downwardly through the holes and through the perforations 23—23 in the leg top plates, with nuts on the bolts under the plates. The base is thus bolted to and rests upon the top of the support.

On the top of the base 1 at one end is a pad 28 provided with four threaded holes 29—29. As shown in Fig. 16, the column 3 has at its lower end a flange 30 which rests upon the said pad, see also Figs. 1 and 16, and bolts 31 are projected through the flange 30 and screwed into the said threaded holes 29 to rigidly mount the column on the base. The column 3 is hollow or tubular as shown in Figs. 1, 16, and 8.

The aforesaid stem 4 is hollow or tubular, Figs. 1 and 8, and exteriorly is circular in cross section, and the upper end portion of the column 3 has a cylindrical bore 32 therein in which the stem has a sliding fit. The lower end of the tubular stem 4 is closed by a nut 33, Fig. 1, secured thereon by a plurality such as three screws 34 one of which is shown in Fig. 1. An elevating screw 35 is meshed with the nut and extends upwardly therethrough into the stem 4, and downwardly therefrom below the nut, and means now to be described is provided to turn the screw to cause it to react upon the base 1 and raise or lower the stem 4 in the column 3, such means being shown best in Fig. 7, although shown in simplified form to smaller scale in Fig. 1.

At the lower end of the screw 35 is a reduced diameter screw stem 36 providing a shoulder 38 on the screw. The stem 36 extends through a hole 37 in the pad 28 of the base 1, Figs. 7 and 18, and a ball thrust bearing 39 is provided between the shoulder 38 and the base 1. A bevel gear 40 is keyed as at 41 to the stem 36, and a thrust ball bearing 42 is provided between the gear and the base 1. A nut 43 threaded on the stem 36 below the gear 40 and having a cotter key arrangement 44 to selectively lock it in any adjustably rotated position, mounts the aforesaid parts in assembled relation on the base 1, with lost motion in the thrust bearings 39 and 42 reduced to the minimum, and with the screw held against lateral displacement by the stem 36 in the bore 37, but rotatable by the gear 40, and with the thrust bearings anti-frictionally taking up the thrust of the screw 35 and transmitting it to the base 1.

A bevel gear 45 is meshed with the bevel gear 40, keyed or pinned to a shaft 46 rotatably supported in a bearing 47, mounted in a bracket 48 secured upon the underside of the base 1 by screws 49 projected through the bracket and screwed into the base 1, the threaded holes in the base for the same being shown at 50—50, Fig. 18, and indicated in Fig. 7.

The shaft 46 extends all the way to the front of the machine and outwardly through a forward wall 51 of the base 1, Figs. 1 and 7, wherein it has a rotary bearing 52, the outwardly projecting end of the shaft having a transverse pin 53 therein, whereby a crank handle 54 may be detachably telescoped on and clutched to the shaft 46 in the well known manner illustrated, to rotate the shaft, and as will now be understood this will rotate the screw 35 to raise or lower the stem 4.

In order that the stem 4 may be rigidly locked to the column 3 after its position is in this manner adjustably changed, and in order that the stem 4 may be freed to be raised or lowered as described, the stem has a longitudinal wedge-form keyway 55 in the rear side thereof, Figs. 1 and 8. A wedge 56 having an inner portion formed to wedgingly fit the keyway 55 and a rearward portion reciprocable in a bore 57 in the column 3 is provided, the outer open end of the bore 57 being threaded as at 58, and a stud 59 being screwed into the threads 58. Upon rotating the stud 59 in one direction the wedge 56 is engaged with the keyway 55 to lock the stem 4 and column 3 rigidly together and to prevent rotation of the stem 4 in the column out of a preselected position for it; and upon rotating the stud in the other direction the engagement is loosened whereby the stem may be freely raised or lowered. To rotate the stud 59, a handle 60 is mounted on the outer end of the stud.

The preferred way to mount the handle 60 on the stud 59 is to make the stud 59 of hard metal such as steel with longitudinal teeth or splines 61 thereon, and to make the handle 60 of relatively soft metal such as aluminum with a smooth bore therein embracing the splines, and with one side of the bore slotted out or open as at 62, and with a screw 63 to clamp the soft metal bore upon the splines. (This construction is not illustrated in cross section for the handle 60, but an identically similar construction with the suffix A for the reference characters is shown in Fig. 11 for another part to which reference may here be made.)

The hard metal male splines 61 bite into the soft metal of the handle making groove like indentations or female splines thereon. If due to wear or due to any other cause requiring adjustment of the handle rotatively on the stud 59, the screw 63 is loosened and the handle rotated on the male splines until the male splines again seat in the female splines made in the soft metal. By this method, intermeshing male and female splines are provided respectively on the stud and on the handle without the necessity of cutting accurate female splines by machining operations in the handle. Also, the splines 61 need not be cut by a cutting tool but can be formed simply by knurling.

Preferably the handle 60 is bent around the column 3 to bring the end 64 of the handle opposite the side of the column, as shown in Fig. 8. The operator to operate the wedge 56 for locking purposes may raise the handle or strike it upwardly, and to unlock the wedge he may strike it downwardly, and it will then be stopped by engagement with the side of the column, as indicated in broken line at 64A as a convenient means for limiting the movement of the handle and for making it readily accessible and conveniently operable.

The arm 5 as plainly shown in the drawing, Figs. 1 and 9, is an internally ribbed, downwardly open casting and at its rearward end has an internally projecting flange 66 resting upon an externally projecting flange 65 on the top of the stem 4 and secured thereto by a plurality, such as three screws 67, one of which is shown in Fig. 1, projected upwardly through the flange 65 and threaded into the flange 66. This rigidly joins the arm 5 to the stem 4 as a single unit, whereby the arm 5 may be raised and lowered by the screw 35.

The arm 5 is formed to have an ornamental exterior contour and its outer end is closed by an ornamental cap 68. Extending forwardly and rearwardly along the arm and on its opposite sides, are guides 69 and 70, Figs. 1 and 4, which are parallel and which as shown in cross section in Fig. 9 have upper horizontal planar surfaces 71 and 72 respectively, and planar under surfaces 73 and 74, respectively, inclined downwardly and inwardly.

Figure 4:
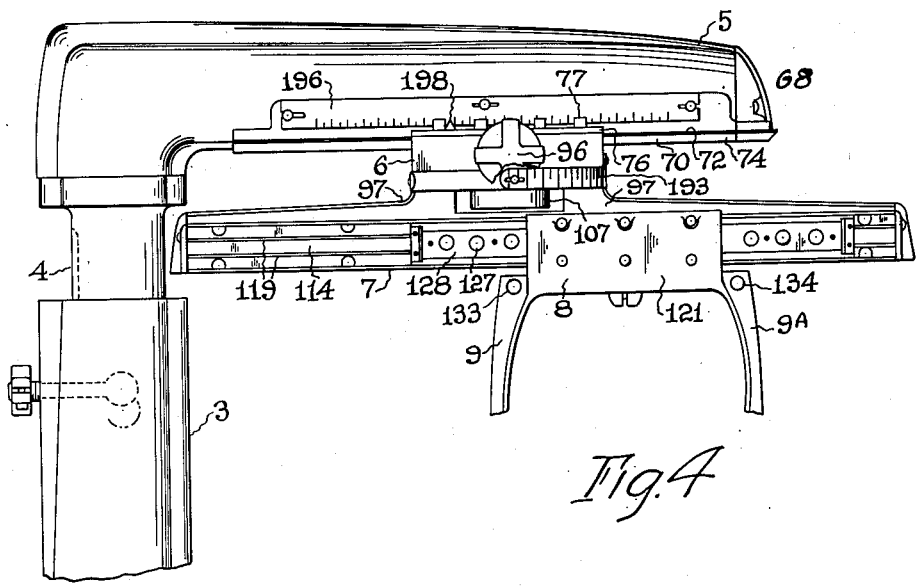
Fig. 4 is a fragmentary elevational view taken in the direction of the arrow 4 of Fig. 2, with parts broken away to simplify the drawing.

The aforesaid pivot carrying-head 6 of Figs. 1 and 4, shown separately in Fig. 13 and in cross section in Fig. 9, is mounted on the guides 69 and 70 to be adjustably slidably positionable therealong, and to be locked thereon in any adjusted position as follows.

A pair of caps 75 and 76, Figs. 1, 4, and 9, are secured upon the upper side of the pivot carrying-head 6, by screws 77—77, and overlap the horizontal surfaces 71 and 72, and slidably engage the same, and support the weight of the pivot carrying-head 6 and its associated parts.

The pivot carrying-head has an inclined surface or face 78 engaging and fitting the inclined surface 74 of the guide 70; and the inclined surface 73 of the guide 69 is similarly engaged by the pivot carrying head, but through the agency of a gib 79 mounted thereon, shown in section in Figs. 9, 14, and 15 and longitudinally in plan in Fig. 13, this gib being mounted as follows.

A pair of spaced pins 80—80 are press fitted into suitable drilled holes in the head 6 and the pins project loosely into holes 81 in the gib. The gib has a planar surface 82 and is positioned at an inclination to engage the surface 82 with the said inclined surface 73. Behind the gib are two spaced screws 83 threaded through the head 6 and abutting at their inner ends upon the back side of the gib 79 whereby the gib may be propelled inwardly (or outwardly) to adjustably take up lost motion between the surface 82 and the said surface 73; and lock screws 84 threaded into the same threads as the screws 83 may be screwed in to engage the screws 83 to lock them in adjusted positions.

By this means and with reference to Fig. 9, the gib 79 may be adjustably positioned toward and from the guide 69 to take up lost motion and provide a smooth sliding engagement between the caps 75 and 76 and the horizontal surfaces 71 and 72, and between the surface 78 and the surface 74, and between the gib itself and the surface 73.

Means is also provided to lock the pivot carrying head 6 in any adjusted position along the guides 69 and 70 and comprises, see Fig. 9, a plunger 85 behind the gib 79 reciprocable in a bore 86 in the pivot carrier 6 and connected to a threaded stem 87 which is threaded into the outer end of the bore 86 and provided with a handle 88 for turning the threaded stem. The threaded stem 87 has a rotary connection with a plunger 85 whereby the plunger 85 may be propelled in the bore without rotating therein upon turning the handle 88, and while this rotary connection may be variously made that shown in the drawing operates as follows. Upon screwing the stem 87 inwardly, its inner end engages the plunger 85 and propels it inwardly. Upon turning the stem 87 in the other direction, a shoulder 89 associated with and connected to the plunger 85 engages a corresponding shoulder within the handle 88 to propel the plunger 85 outwardly.

When the plunger 85 is propelled inwardly by the handle 88 it engages the back side of the gib 79, and because the gib 79 is loosely mounted on the carrier 6 by the pin construction above described, particularly in connection with Figs. 13 and 15, the gib will be forced into locking engagement with the guide 69 at the surface 73.

As will become clearer hereinafter, adjustably positioning the pivot carrying head 6 along the guide 69 and 70, adjustably changes in general the working zone of the tool with respect to work on the work table 12. For some operations, the pivot carrier 6, after unlocking it from the guides 69 and 70 by the handle 88, may be shifted by hand, but in other instances it may be desired to adjustably position the pivot carrying head 6 with a very accurate or micrometer movement, and the means for this is shown in Figs. 9 and 10 and indicated in some of the other figures.

To this end, a longitudinal rib 90 is provided on the inside of the arm 5, and a toothed rack 91 is secured on the under side of the rib by a plurality of screws 92, projected through perforations in the rack and threaded into threaded holes in the rib. A pinion 93 has its teeth meshed with the teeth of the rack, and is connected to a shaft 94 rotatable in a bearing bore 95 in the carrier 6 and having a handle 96 on the shaft for turning it.

By turning the handle 96, the pinion 93 is rotated and propels the rack 91 and the pivot carrying head 6 on the guides 69 and 70 with micrometer movement. When the carrier is propelled by hand the pinion 93 and the handle 96 will be rotated idly.

The trackway referred to generally at 7 is mounted on the pivot carrying head 6 so as to be rotatably adjustable thereon about a vertical axis, and may be locked thereon in any adjusted position and the purpose of making the pivot carrier 6 adjustable along the arm 5 as described, is to adjustably move this vertical pivot axis; and the construction of this pivot axis will now be described and reference may be had to Figs. 1 and 9.

The trackway 7 is an elongated structure as shown in Fig. 1 and to be described, but at this point of the description, reference is made to two risers 97—97 extending upwardly from the upper side of the trackway as a whole and at about the middle of the trackway. Upon these risers 97 is mounted a clamping disc 98 by means of screws 99—99, Fig. 9, projecting upwardly through the risers and screwed into the disc 98. In Fig. 9, two of these screws are shown for one of the risers 97, and in Fig. 12 wherein the disc 98 is shown separately, all four screws 99 for the two risers are identified. It will be observed that there is an opening 100 in the trackway 7 under the risers 97 to give access to the screws 99.

The clamping disc 98, shown separately in Fig. 12 and in section in Fig. 9 is in general circular, and at its center a large diameter pivot pin 101 extends therethrough and is keyed thereto as at 102, so that the disc and the pin will rotate together. At its upper end portion the pin 101 has rotational bearing in a bushing 103 in or on the pivot head 6, and the pin extends upwardly beyond the bushing, and is threaded as at 104, and a nut 105 on the threads 104 rests upon the upper end of the bushing 103. The lower end of the pin 101 projects downwardly out of the disc 98, and is threaded as at 106, and has a clamping nut 107 on the threads. A laterally extending rod 108 is threaded into the side of the nut 107 and on its outer end has a handle 109 by which an operator can turn the nut 107, through part of a revolution, to loosen or tighten it.

The upper side of the nut 107 when screwed upwardly on the threads 106 engages a bearing or clamping washer 110 between the nut 107 and the disc 98.

By the construction thus far described, the weight of the trackway 7 and parts associated therewith to be described, is transmitted through the risers 97 and screen 99 to the disc 98, through the washer 110 to the nut 107 and stem 101 and thence to the nut 105, and thence to the head 6; and when the nut 107 is loosened, the trackway 7 and disc 98 may be rotated by hand, the pin 101 rotating in the bearing bushing 103, to angularly position the trackway 7; and when the nut 107 is tightened, the said parts are rigidly locked in their rotated positions by clampingly engaging the disc 98 with the head 6 above it, on mutually engaged large diameter wedging surfaces of the disc and head as follows.

The angular throw of the handle 108 to tighten or loosen the nut 107 is adjustable by taking up endwise lost motion of the pin 101 by the nut 105 on the top of the pin. The nut 105 is locked by being split as at 320 on one side and a set screw 321 threaded into the side of the nut, to spread the slot, upon engagement of the inner end thread of the set screw, with the inner end of the corresponding thread in the nut.

On the upper side of the disc 98 at 111 is a frustoconical surface, which if extended would have an apex in the central axis of the pin 101; and on the underside of the carrier 6 is a like surface 112 coinciding with the surface 111, these surfaces being shown in Figs. 9, 12, and 13. It will be observed in Fig. 9 that except for these engaging conical surfaces 111 and 112, the underside of the head 6 is out of contact with the upper side of the disc 98. When as described, the nut 107 is turned to screw it inwardly on the pin 101 and it engages the washer 110 of the disc 98, it raises the disc 98 to wedgingly engage the conical surfaces 111 and 112, and these, being on large diameters, rigidly clamp the rotary disc 98 to the non-rotating head 6 in a manner to resist rotation of the disc 98 and the trackway 7 attached thereto, even if, because of the length of the trackway 7, great torque should be applied thereto and to the disc 98 in the direction to turn it. It is needless to add that for obvious reasons, the pin 101 and the wedging surfaces 111 and 112 are coaxial.

As to the construction of the trackway 7, it is in general an elongated casting, Figs. 1 and 9, having spaced side walls 113—114, on the opposite outer portions of which are ball bearing raceways, formed of metal rods 115—115 (for the side wall 113) wedgingly seated in grooves 116—116 in vertically spaced apart parallel relation. Each of the rods 115 is retained in its groove 116 by a sheet metal strip 117 overlapping a part only of the rod 115, and mounted on the side wall 113 by screws 118.

Like rods 119—119 are similarly provided on the side wall 114 and secured thereon in a similar manner.

These raceway rods are disposed so that the rods of each pair 115—115 and 119—119 are parallel to each other, and so that the rods of one pair are parallel to the rods of the other pair.

As to the carriage 8, it comprises two side portions 120 and 121 extending upwardly opposite the trackway side walls 113 and 114, and spaced therefrom as shown in Fig. 9, and provided with short raceway rods 122—122 for the side portion 120, and 123—123 for the side portion 121, seated in grooves therein similar to those provided for the trackway rods; and each carriage rod is held in a groove by a sheet metal strip 124 overlapping a part only of the rod and secured on the carriage by screws 125.

The carriage 8 is supported on the trackway 7 by a series of bearing balls 126 between and engaging the raceway rods 122—115 and by a series of balls 127 between and engaging the raceway rods 123 and 119; and each series of balls is maintained in longitudinally spaced relation by a strip-like cage construction 128 in which the balls are loosely trapped.

The carriage 8 may be reciprocatively propelled longitudinally along the trackway, the raceway rods of the carriage rolling on the balls and the balls rolling on the raceway rods of the trackway. Preferably the cage construction 128 is prevented from dragging on adjacent parts with undue friction by tongues 129 formed on the metal rod retainers 117 and hooking over adjacent portions of the cage construction, as shown.

The aforesaid hangers 9 and 9A for supporting the motor 10 are preferably cast integrally with the carriage 8 and depend therefrom. These hangers have upwardly open slits 130, Figs. 2, 3, and 9 at their upper ends. This construction makes the upper ends of the hangers in two separate parts 131–132, and completely separates the side portions 120 and 121 of the carriage. Bolts 133, Fig. 9 and Fig. 3, are projected through one of the hanger portions 131 and threaded into the other portion 132; and upon screwing these bolts in or out, the resilience of the cast metal hangers allows the upper portions 131 and 132 to be drawn closer together or to move farther apart, and this adjusts the positions of the side portions 120 and 121, whereby undue lost motion in the ball bearing trackway and carriage construction described above, may be removed and the bearings adjusted. The bolt 133 at the upper end of one hanger arm 9 is shown in Fig. 9 and Fig. 1 and the other bolt 134 for the other hanger arm is shown in Figs. 1 and 2. Either or both of these bolts may be turned to adjust the parts of the ball bearing and raceway construction as described.

The ball bearing construction described permits the carriage 8 to be propelled without friction along the trackway 7. Means is provided however to lock it against movement along the trackway. This means comprises, Fig. 9, a shaft 135 rotatable in a bearing bore 136 in one side portion of the carriage 8, for example the side portion 120 as shown; and a handle 60A is mounted on the shaft 135 to turn it. The bearing bore 136 has shoulders 138 and 139 at its opposite ends, and the shaft 135 has an enlarged diameter portion 140 abutting the shoulder 139.

The inner end of the shaft 135 is screw threaded into a gib 141 having an inclined or wedging surface 142 engageable with a like wedging surface 143 extending along the trackway side wall 113. A spring 144 surrounds the shaft 135 and abuts at one end upon the gib 141 and at the other end upon the shoulder 138.

The spring holds the shaft 135 toward the left as viewed in Fig. 9 with the enlarged diameter portion 140 engaging the shoulder 139, the spring reacting upon the shoulder 138 and the gib 141 to this effect.

Upon rotating the shaft 135 by the handle 60A in one direction, the gib 141 is propelled along the threads of the shaft, in the nature of a traveling nut, to disengage the said wedging surfaces 142 and 143 to free the carriage 8; and when the handle is rotated in the other direction, the gib 141 travels along the threads to frictionally engage the said wedging surfaces to lock the carriage against movement on the trackway.

The preferred means of mounting the handle 60A on the shaft portion 140 is shown in Fig. 11, and will be understood from the description already given of a like means for attaching the handle 60 of Fig. 8 to the screw 59.

The motor 10 is supported at the lower ends of the hangers 9 and 9A by trunnion bearings by which the motor may be adjustably rocked around a trunnion axis at right angles to the rotational axis of the motor, and this will now be described, reference being had to Figs. 1, 2, and 26 and particularly Fig. 5.

On the left side of the motor 10 as viewed in Fig. 5 is a large diameter trunnion 145 in the form of a cup. It is shown in one piece but optionally its bottom may be a separate piece. The outer wall surface of the cup is cylindrical; and the lower end of the hanger 9A is enlarged into a ring 146, having a cylindrical bore 153 in which the trunnion 145 has rotary bearing. The ring is split on one side as at 147, and provided with two lugs 148—149 at each side of the slit, and a bolt 150 having a handle 151 thereon for turning it, is projected through aligned bores in the lugs and into a nut 152, whereby the ring 146 may be contracted to grip the trunnion 145 or released so that the trunnion can be turned therein.

It may be inserted here that the opposite trunnion bearing in the hanger 9 is constructed to prevent endwise shifting of the motor 10 on the hangers, in a manner to be described in connection with Fig. 5, so that the trunnion 145 is allowed to float axially in the bore 153 when freed as described.

The cup form trunnion 145 is mounted upon the motor by any suitable means, that shown comprising a plurality of bolts 154 shown in Fig. 2 one of which is shown in Fig. 5, projected through the bottom of the cup and on through the cup and screwed into the motor frame.

An operator's handle 155 of U-form is mounted upon the cup trunnion 145 by bolts 156 projected through the cup bottom and screwed into the open ends of the handle, and, as will be more fully referred to, the handle may be used to reciprocate the motor and the carriage 8 along the trackway 7, in all rotated positions of the motor 10 on its trunnions.

The cup form trunnion 145 is made deeper axially than would be necessary to give bearing in the hanger ring 146, so as to serve as a housing for electrical connections and control apparatus for the motor 10. Electric current is conducted to the interior of the motor housing by an electric cable fragmentarily shown at 157, and the starting and stopping switch for the motor is made convenient to the hand of the operator while grasping the handle 155, by being mounted as shown at 158, upon the bottom of the cup 145, the switch shown being of the type comprising a toggle arm 159, and electric wires 160 being led from the motor to the switch and connected thereto interiorly of the cup form trunnion.

In some cases, the motor 10 will be a single phase alternating current motor, the starting circuit of which comprises a condenser, and in such cases the condenser 161 may be mounted within the cup form trunnion and connected to the motor circuit by suitable wires as shown. Also, in some cases it may be desired to provide an automatic current overload switch of the push button reset type, and such a device is shown generally at 162 within the cup form trunnion, and with its reset push button 163 projecting outwardly through the cup bottom wall and accessible to the hand of the operator grasping the handle 155.

Various other types of electrical apparatus associated with the starting and stopping of the motor 10 and adapted to different kinds of motors and starting circuits may be mounted within the cup form trunnion as will be understood. The trunnion 145 thus performs a number of functions in addition to its function as a trunnion bearing.

At the right hand side of the motor 10 as viewed in Fig. 5 the trunnion bearing for the motor on the hanger 9 is as follows.

A mounting plate 164 is mounted upon the motor frame in any suitable manner for example by a plurality of screws 165, and has an axially disposed threaded hole 166 therein. A stud 167A is screwed into the hole 166, rigidly, by means of a shoulder 168A on the stud engaging the plate 164; and has an enlarged head 168 on its outer end and intermediately has a trunnion shaft portion 167.

The lower end of the hanger 9 is enlarged into a ring 169 and a bearing plate 170 is mounted on the ring by a plurality such as four screws 171, Figs. 3, 5, and 6. The bearing plate 170 has a bearing bore 172 therein in which the trunnion shaft 167 may rotate or oscillate, and at the ends of the bore 172 the material of the bearing plate, by engaging at one end the plate 164 and by engaging at the other end the enlarged head 168, prevents axial shifting of the motor at this trunnion bearing.

It is desirable to be able to adjust the rotational axis of the motor with respect to the plane of reciprocation of the carriage 8 along the trackway in all pivoted positions of the trackway on its described pivot axis, and to this end the trunnion axis on the hanger 9 is made universally adjustable thereon by the following means shown best in Figs. 5 and 6.

The screws 171 which secure the bearing plate 170 to the ring 169 of the hanger 9 pass through holes 173 in the bearing plate 170 larger than the screws. The bearing plate 170 has on its inner side a cylindrical rib 174. A plurality such as four, radial screws 175, see also Fig. 3, are threaded radially through the ring 169 and with their inner ends abutting the rib 174. By first loosening the screws 171, one of the screws 175 may be backed out a fraction of a turn and the diametrically opposite screw 175 screwed in correspondingly, which has the effect of shifting the trunnion shaft 167 with respect to the hanger 9. The screws 171 are then again tightened to fix the adjustment. As a further precaution to fix the adjustment, the threaded bores for the screws 175 may be longer axially than the screws themselves, but permitting a screw driver to enter the threaded holes to turn the screws, and after the screws have been adjusted, locking screws 176 may be screwed into the holes tightly upon the outer ends of the screws 175 to lock them.

As to the work table 12, Figs. 1 and 16, it is made of wood and in two parts having a common top plane 201, a front part 177 and a rear part 178, and with a forward fence 179 therebetween; the fence being removably secured in position by wedges 180 driven in between the fence and the rear part 178. The two parts of the table are connected together by side cleats 181—181 and by plates 182 screwed upon the bottom of the table parts; and the cleats and the plates support the fence 179 and the wedges 180 as will be clear from the drawing. A rear fence 183 is also provided at the rear of the table, being screwed to the table part 178, and the two fences 179 and 183 are parallel.

By means best shown in Fig. 17 but also shown in Figs. 1 and 16, the table 12 as a whole is mounted upon and secured to the cast metal base 1 by means which permits the table to be adjusted to level up its top plane surface or, in other words, to dispose or restore the top surface in a plane parallel to the plane of reciprocatory movement of the motor and of a tool driven thereby in all angularly adjusted positions of the trackway.

To this end, a plurality such as four studs 184 are screwed into bosses 185 formed on the base 1, and project above the base, and have wrench receiving heads 186 for turning them to screw them in and out. The upper ends of the studs 184 are flat or planar and the table 12 rests thereon and is supported thereby. The upper ends of the studs 184 are internally threaded as at 187. Screws 188 are projected downwardly through the table 12 and screwed into the threads 187 of the studs, the heads of the screws 188 engaging the bottoms 189 of counterbored holes in the table top, and the upper ends of the screws 188 are well below the top surface of the table. The screws 188 when screwed down tight, clamp the table 12 between the heads of the screws and the tops of the studs 184, and this clamping action on the studs 184 also locks them against rotation. To level up the top of the table as described, the screws 188 or some of them may be loosened and the corresponding studs 184 turned to screw them in or out of the bosses 185, to lower or raise their upper ends, and then the screws 188 again tightened.

As indicated in Fig. 16, the heads of the screws 188 may have hexagonal recesses 190 therein to receive an Allen wrench for turning them; and to turn the studs 184, an ordinary thin flat wrench may be inserted laterally between the top of the base 1 and under side of the table 12 to engage the heads 186.

As mentioned, the motor may be adjustably rocked on its above described trunnion axis and secured in rocked position by the bolt 150 on the hanger 9A, and to indicate the angular rocked positions, a scale 191 is provided on a strip of metal wrapped around a part of the trunnion 145, see Figs. 1 and 5, and secured thereon, and a scale pointer 192 therefor is mounted on the hanger 9A.

The trackway 7 being pivoted for movement to different angular positions around a vertical axis on the arm 5, a scale 193 is provided on a band of metal wrapped around and secured to the circular periphery of the disc 98, Figs. 1, 2, and 4, and a scale pointer 194 therefor is mounted on the pivot carrying head 6.

The pivot carrier 6 being adjustably movable along the arm 5 on the guides 69 and 70, two scales 195 and 196 are provided to indicate its position and the position of the tool, with respect to the two fences 179 and 183, respectively, on the work table 12, the scales 195 and 196 being shown in Figs. 1, 4, and 9, and a pointer 197 for the scale 195 and a pointer 198 for the scale 196 are provided, respectively mounted on the caps 75 and 76, shown in Fig. 9, and indicated in Figs. 1 and 4.

The foregoing description sets forth the various positions to which the motor 10 or its shaft axis may be adjustably moved, as to elevation above the work table 12; and as to angularity around the axis of the trunnions 145 and 167; and as to the directions in which the motor may be reciprocated by the operator's handle 155, etc.

The description thus far applies to the machine whether the tool to be driven by the motor is a rotary tool mounted on the motor shaft (as for example, a circular saw) or whether it is a tool having both axial and rotary movement (for example a drill); and the following additional description, applies particularly to tools of the latter type (the additional description for tools of the rotary type driven directly by the motor shaft, to follow later).

As will be apparent from Figs. 1, 2, and 5, the motor 10 is shown with its shaft 199 or shaft axis in the vertical position, and has thereon a V-belt pulley 200.

Mounted on the side of the motor housing is a tool spindle carrier 201A including a tool support unit for a rotary and axially movable tool and a spindle head 208; the unit being indicated generally at 201A, in Figs. 2 and 1; and the parts thereof being shown to larger scale in Figs. 19 to 25 inclusive.

The unit 201A comprises a base plate 202 secured upon the side of the motor housing by a plurality such as four screws 203—203, best shown in Figs. 19 and 21.

The base plate 202 has upper and lower hinge lugs 204 and 205 projecting forwardly therefrom, with aligned pintle bores 206 and 207 therein.

A tool spindle head indicated generally at 208 has upper and lower hinge lugs 209 and 210 thereon having aligned pintle bores 211 and 212 therein.

A hinge pintle pin 213 in all four bores has a handle 214 on its upper end for inserting it in or removing it from the bores.

The upper carrier lug 209 rests upon the upper base plate lug 204 and the lower carrier lug 210 is below the lower base lug 205; so that the head is supported by the base plate 202 and trapped thereon against longitudinal movement on the pintle pin 213 while having hinging movement on the pintle pin, toward and from the motor.

The hinged spindle head 208 comprises a spindle housing 215, a belt tensioning arm 216, and a transverse bearing barrel 217 all preferably formed as a one piece casting (see Fig. 24).

The spindle housing 215 is tubular as best shown in Figs. 19 and 25; and has a ball bearing 218 seated in a recess 219 in its upper end portion.

A pulley head 220 has a shoulder 221 engaging the upper side of the inner raceway 222 of the bearing 218, a shank 223 below the pulley head going through the inner raceway, and, on the underside of the inner raceway a spring washer 224 in a corresponding annular groove in the shank, retains the shank in the raceway.

A reduced diameter shank 225 (shown in dotted line in Fig. 19) above the pulley head 220 and providing a shoulder 226 on the head, goes through a V-belt pulley 227, and beyond the pulley the shank is threaded into a nut 228, which clamps the pulley between the shoulder 226 and the nut 228.

The shanks 223 and 225 and the head 220 have a bore 229 therethrough (shown in dotted line in Fig. 19) through which extends a tool spindle 230, having a spline 231 in the side thereof.

The pulley 227, head 220, and shank 225 are keyed to the spline 231 by a key 232 which causes them to rotate in unison but permits the spindle 230 to slide axially therethrough in the bore 229 and with the spline 231 always engaged with the key 232.

The pulley can be removed and replaced by another of different diameter, by first removing the nut 228.

The spindle 230 extends downwardly below the bearing 218 through the spindle housing 215 and at its lower end a tool chuck 233, of usual construction for gripping tool shanks, is mounted. Preferably the chuck 233 has a shank 234 in a bore in the end of the spindle and the same may be tapered (not shown) according to well known practice.

A spindle sleeve 235 surrounds the spindle 230 and has the outer raceways of upper and lower ball bearings 236 and 237 seated in recesses 238 and 239 in the opposite ends of the sleeve.

The spindle 230 fits in the inner raceways of the ball bearings 236 and 237. A collar 240 on the lower end of the spindle 230 engages the inner raceway of the lower bearing 237 and an axially adjustable shoulder 241 engages the inner raceway of the upper bearing 236, the adjustable shoulder 241 being provided by a washer 242 and a nut 243 threaded on the spindle 230. By this means, the spindle 230 and sleeve 235 are secured together to move axially in unison, with the spindle rotatable in the sleeve on the bearings 236 and 237.

The lower end portion of the spindle sleeve 235 slidingly fits in a bore 244 at the lower end of the spindle housing 215, which, together with the ball bearing 218 at the upper end of the spindle housing, centers the rotational axis of the spindle 230 in the spindle carrier as a whole.

The front of the tubular spindle housing 215 as viewed in Fig. 19, is split as at 245 (see also Figs. 1 and 25) and ears 246 and 247 are provided on opposite sides of the split; and a bolt 248 has a shoulder 249 engaging one ear, and passes through bores in the ears and is threaded into a nut 250 engaging the other ear. The bolt when turned draws the ears together, constricting the end of the spindle housing and clamps the spindle sleeve 235 in the bore 244 against longitudinal or axial movement, to fix the tool spindle in any desired axial position; and to turn the bolt 248, it is provided with a handle 251.

The spindle sleeve 235 has transverse rack teeth 252 on the back side thereof as viewed in Fig. 19, not shown in that figure, but shown in Figs. 24 and 25, and they are meshed with gear teeth 253 on a transverse spindle shaft 254 mounted to rotate in plain bore bearings 255 and 256 formed in the spindle carrier bearing barrel 217.

When the clamp bolt 248 is loosened, rotation of the spindle shaft 254 in one direction will raise the spindle sleeve 235 and spindle 230; or in the other direction will lower the spindle, to adjust the tool (mounted in the chuck 233) to the work; or if the tool is a drill, to feed it into the work.

To rotate the spindle shaft 254 by hand, a handle bar 257, Figs. 19 and 20, projects loosely through a bore 258 at the outer end of the shaft, and has handles 259 on its ends; and friction is provided, to hold the handle bar from idly sliding in the bore, by a ball 260 pressed against the handle bar by a spring 261. A screw 262 is also provided to optionally fasten the handle bar rigidly to the shaft when desired.

Means is also provided to counterbalance the weight of the spindle and its associated parts, shown in Figs. 19 and 25. A coiled "clock spring" 263 is mounted in a spring housing 264, the housing being secured upon the adjacent portion of the bearing barrel 217, by one or more screws 265. The spring 263 and housing 264 surround the end of the spindle shaft 254, which for this purpose extends beyond and out of the bearing 256. One end of the spring 263 is anchored to the spring housing 264 as at 266; and the other end is secured as at 267 to an adjusting element 268 telescoped over the end of the shaft 254; and which may be rotated on the shaft to adjust the tension of the spring, and fixed after adjustment by a screw 269, locking the adjusting element to the shaft.

When the spindle 230 and tool chuck 233 are reciprocated by turning the spindle shaft 254 in alternate directions during operation of a tool in the chuck, it is sometimes desirable to stop the downward movement at a preset point. To this end, a split collar 270, Figs. 19 and 20, is clamped around the lower end of the spindle sleeve 235, by means of ears 271—271 on the collar, and a screw 272 for drawing the ears together in a well known manner. The collar 270 has a lug 273 extending laterally from one side of it. A stud 274 is adjustably threaded in the lug 273 and extends upwardly parallel to the spindle sleeve 235 on the outside of the spindle housing 215; and is locked in suitably adjusted position by a lock nut 275. A forked lug 276 extends laterally from the spindle housing 215 and freely embraces the stud 274. A pair of lock nuts 277—277 are adjustably positionable along the stud 274 above the lug 276.

When the spindle shaft 254 is rotated to move the spindle sleeve 235 and spindle 230 downwardly, the stud 274 is moved axially downwardly therewith and the movement is stopped by the lock nuts 277 engaging the lug 276. The stud 274 may have a flat face 278 on one side of it, and a scale may be provided as shown in Fig. 19 on the face, calibrated so that the distance of the lock nuts 277 above the lug 276 may be read to preselect the amount of limited axial movement of the spindle.

As shown in Figs. 2 and 5, there is a V-belt pulley 200 on the motor shaft 199; and as in Fig. 2, the V-belt pulley 227 on the spindle 230 is aligned with the pulley 200, and a V-belt 280 connects the pulleys, so that the motor 10 drives the tool spindle 230.

To suitably tension the belt 280 the following means is provided shown in Figs. 19, 20, 23, and 24. In general the belt is tightened by hinging movement of the spindle head 208 away from the motor, and fixing it when suitably moved.

A horizontal pin 281 is pivoted to swing in a horizontal plane, by a stud 282 passing through one end of the pin, and threaded into a boss 283 on the base plate 202. The pin 281 lies along the underside of the face 284 on the aforesaid belt tensioning arm 216 on the hinged spindle carrier 208; and the pin passes through a bore 285 in one end of a stud 286 loosely fitting in a bore 287 in the arm 216, and the other end of the stud 286 being threaded as at 288 and extending beyond the bore 287. A nut 289 on the stud threads, when turned, draws the stud 286 inwardly in the bore 287 and clamps the pin 281 rigidly against the face 284.

To adjust the tension of the belt, the nut 289 is first loosened, the spindle head 208 is then rocked on its hinge pintle pin 213 as described, and the nut 289 is then tightened. The pin 281 swings on its pivot stud 282 and the stud 286 turns in its bore 287 during this operation, to compensate for the arcuate hinging movement of the stud 286 around the hinge pintle 213.

The entire spindle head 208 and all of its associated parts can be removed from the motor housing, when desired, by loosening the nut 289 and first hingingly rocking the spindle head 208 toward the motor to loosen the belt 280 so it can be removed; then rocking it the other way to free the pin 281 from the stud 286; and then withdrawing the pintle pin 213. The pin 281 may be lifted from its pivot stud 282 and for safe keeping may be reinserted in the stud bore 285 and clamped in place by tightening the nut 289. If desired, the base plate 202 may be left permanently on the motor housing when once installed.

A guard 290 for the belt 280 and pulley 227, Fig. 2, may be provided, comprising ears 291, Figs. 19 and 20, which overlap the upper end of the spindle housing 215 and have slots 292 therein embracing threaded studs 293 projecting from the spindle housing, and wing nuts 294 for attaching and detaching it.

In the operation of the machine, as described above, when the tool for example is a drill, as shown at 279, Figs. 1, 2, 19, and 20, the tool may be positioned by adjustably rocking the motor 10 to various angular positions on the axis of its trunnions 145—167 as described and reading the angular position on the scale 191 and fixing it by the handle 151; whereby the entire tool spindle carrier 201A moving bodily with the motor 10, positions the drill to drill holes in work on the work table 12, including vertical holes and holes at any angle to the vertical; and the tool may be adjustably positioned to drill such vertical or angular holes at any point of a large area of work, by adjustably positioning the carriage 8 along the trackway 7 as described and fixing it by the handle 60A, and by adjusting the angular position of the trackway about the vertical axis of the pivot head 6, or pivot pin 101, on the arm 5 as described and fixing it by the handle 109, and by shifting the vertical trackway axis to different positions along the arm 5 as described and fixing it by the handle 88. The drill may thus be brought over any desired point above the work table 12 and positioned to drill vertical holes or holes at any angle to the vertical.

In each position of the tool, it may be rotated by the motor 10 and may be moved axially manually, to enter the work and be withdrawn therefrom, by the handle 257.

All other kinds of tools that are axially pressed into the work and withdrawn from it while rotating may similarly be used.

A circle of holes of a wide range of radii may be drilled in the work, either vertical holes or a series of holes on the ideal surface of a cone with the apex upward or downward, by positioning the carriage 8 along the trackway 7 until the horizontal distance from the vertical trackway axis (axis of the pivot head 6) to the drill is the desired radius and fixing it by the handle 60A; and then after drilling one hole, rotating the trackway on its vertical axis to position the drill for the next hole.

In a similar manner, the edge of a work disc may be cut to a true circle or to a conical surface by a reamer type of tool or a cylindrical abrading tool; by lowering the tool to a suitable position and fixing it there, by the handle 251, and then continuously rotating the trackway about its vertical axis while the tool is rotating.

As illustrated in Fig. 27, rows of parallel holes as at a, b, c, or d may be drilled; by angularly positioning the trackway 7 to be in the longitudinal direction of the rows of holes, successively positioning the carriage 8 along the trackway 7 to drill successive holes of one row, and then shifting the trackway bodily along the arm 5 for the next row of holes. Similarly rows of holes at preselected divergent angles as at e may be drilled.

By rocking the motor 10 on its trunnion axis until the drill is horizontal, the above described positioning adjustments may be used for drilling holes in other surfaces than horizontal, for example holes in a vertical surface as in Fig. 28, where two rows of parallel holes at f are shown. After drilling one row of holes, the drill is moved vertically by raising or lowering the arm 5 as described. Holes in surfaces at an angle to the horizontal may similarly be drilled.

Planing tools of the type shown in Fig. 29 may be utilized. Such tools are known having a shank 295 for gripping by the chuck 233 and a circular series of cutting teeth 296 having cutting edges 297 in a plane at right angles to the rotational axis. With the tool spindle 230 set vertically, the tool may be lowered axially by the handle 257 to position the cutting plane at the desired elevation for the work surface to be planed (for example the surface of a board) and fixed at that level by the handle 251, and then the tool may be moved laterally over the work to plane its surface. A very great area may be worked as follows, and as illustrated in Fig. 30.

A board 298 to be planed is laid on the work table; the tool is lowered to the working position as at 299. The carriage 8 is then propelled along the trackway 7 while the tool is rotating and planes off a swath along the center line 300. Then the trackway 7 is shifted along the arm 5 to a new position by turning the handle 96 as described for Fig. 9, and a return swath is planed along the center line 300A; and so on repeatedly until the whole area of the board is planed.

The planer may be moved diagonally of the work in a similar manner as indicated in Fig. 31, the planer starting at the position 301 and moving along the center line 302, then shifted to the center line 302A and so on repeatedly.

Surfaces may be sand finished by a tool as shown in Fig. 32 having a planar abrading surface 304, moved over the work as described for the planing tool of Fig. 29.

With these few examples, it is believed unnecessary to expand this description to cover all of the operations which can be performed, by all of the kinds of tools that operate when rotatably driven, and, either axially reciprocated or axially moved to a fixed position; the great multiplicity of such operations being indicated by the possibility that the tool can be fixed in different positions or rendered movable through different paths of movement by the various adjustments which provide for rocking the motor 10 on its trunnion axis, moving the motor supporting carriage on its trackway, rotating the trackway on its vertical axis, shifting the trackway axis along the main arm, and raising and lowering the arm.

In using the drill or other tool in angular positions other than vertical, it is convenient to set it at such angles by means of the scale 191 which indicates the rocked position of the motor on its trunnion axis 145—167. A particular means however is provided by which it may be quickly and accurately returned to its vertical position (or a position at right angles to the work table 12) and this is shown in Figs. 19, 20, and 21.

In these figures, there is shown at 305 a threaded stud, projecting toward and engaging at its end the side edge 306 of the motor hanger 9, at that end of the motor supported on the trunnion 167. As shown in Fig. 21 and as indicated in Figs. 19 and 20, this stud is adjustably threaded through a hinging block 307, disposed between arms 308 and 309 formed on the base plate 202, and hinging on a pin 310 projected through aligned bores in the arms and in the block; the adjusted position of the stud 305 being fixed by a lock nut 311 on the stud.

The block 307 and stud 305 are retained in the position shown in Fig. 21, by a ball 312 and a spring 313 in a recess 314, the ball being spring-pressed into a recess 315 in the block 307.

The block 307 may be manually rocked around the pin 310 from this horizontal position (which position is also shown in solid line in Figs. 19 and 20), to the broken line upright position of Figs. 19 and 20, and will be retained in this upright position also by the spring 313 and ball 312 engaging the side of the block 307 in a recess 316 (Fig. 21) as will be understood; and as indicated for the ball 312 in Fig. 19.

This hinging block 307 is shown to small scale in Fig. 1 and as appears there, it is above the trunnion axis of the motor 10 (which axis for convenience is indicated in broken line at 317 in Fig. 1).

From the foregoing it will be clear that when the motor is rocked on its trunnion axis in one direction (for the purposes described), the stud 305 will move away from the side 306 of the hanger 9, and in the other or return direction will move toward the side edge 306; and if the hinging block is in the rocked position of Fig. 21, and solid line position of Figs. 19 and 20, it will be stopped upon the side edge and determine a position for the tool 279; and that by adjusting the stud 305 longitudinally, this position of the tool can be made exactly vertical to the work table 12.

When the position of the tool 279 is set at an angle beyond the vertical in said one direction of rotation of the motor on its trunnion axis, the stud simply moves away from the side edge 306; but when the motor is rocked in the return direction to set the tool at angular positions beyond the vertical, the block 307 is first manually rocked to the said upright position, which, as shown, moves the stud 305 out of the path of the side edge 306 whereby it may pass beyond it and inside of the hanger 9.

The path of movement of the inner end of the stud 305 is indicated in Fig. 20 by the broken line 318.

This same device may be used to establish a vertical position for the tool 279 when the base plate 202 is, for the first time, secured or installed upon the motor 10, by adjusting the stud 305.

As mentioned hereinbefore, the motor may be used to drive tools mounted on the motor shaft 199. To this end, either the unit 201A as a whole is removed as described or the spindle head 208 is removed by removing the pin 213 and loosening the nut 289; and the motor is rocked on its trunnion axis 145—167 counter-clockwise as viewed in Fig. 2 until the motor shaft 199 is horizontal, and then the pulley 200 is removed and the tool (for example a circular saw) is mounted in its place, as shown for the saw 319 in Fig. 26. It is believed, in view of the foregoing, that a brief description of operations which may be performed by the saw 319, upon work on the work table 12, will suffice.

The saw may be raised or lowered by raising or lowering the arm 5 so as to cut all the way or only part of the way through the work. It may be set vertical to the work table 12 and then reciprocated manually along the trackway 7 by the handle 155, and according to the angular position of the trackway will make cross cuts, or mitre cuts of a wide angular range; or may be set at an angle to the table 12 and cut bevel cuts or combined mitre and bevel cuts. The saw may be set parallel to the fence 179 or 183 and work fed through the saw or the saw fed through the work to make rip cuts. The motor may be rocked until the shaft 199 extends downwardly, that is, is vertical or at an angle to the vertical, and the saw in such positions may make cuts in the side of a work piece.

Other tools such as routers, dadoes, tennoners, dove-tailers, sanders, etc., etc. may be substituted for the saw.

Thus by utilizing the numerous positioning adjustments for the motor, and utilizing the numerous movements of the motor, and utilizing rotary tools on the motor shaft and rotary and axially movable tools, every woodworking operation can be performed with the possible exception of lathe-turning on work supported between centers.

As illustrative of this universal applicability of the machine as a whole, it can perform every operation necessary to make and finish the surfaces of all of the parts of a complicated cabinet having shelves, drawers, doors, etc.

Even ornamental scroll work, curved moldings, etc. can be performed by a tool in the tool chuck 233 of a type, for example, which cuts on its side or on its side and end; by laying out the pattern on the work, positioning the tool, and guiding the work by hand over the work table to cause the tool to follow the pattern or design; and this includes intaglio carving, at different levels, using burr tools, etc.

While I have shown and described a machine tool in complete detail of parts, it is to be understood that the invention is not limited to these details but is comprehensive of all changes and modifications which come within the scope of the appended claims.

I claim:

1. In a machine for driving rotary-and-axially-movable tools; a work table; a motor comprising a housing and a drive shaft; a spindle carrier on the motor housing rotatably supporting a manually axially movable tool spindle; a transmission between the motor shaft and spindle; a support for supporting the motor above the work table, comprising a depending hanger; a bearing on the motor housing and hanger on which the motor housing and spindle carrier may be adjustably rocked to angularly position the tool spindle with respect to the work table; a stop on the spindle carrier movable to two positions, and in one position having a path of movement, upon rocking of the motor, in which it engages the hanger to predetermine an angular rocked position for the tool spindle; and in the other position having a path of movement which clears the hanger.

2. In a machine for driving rotary-and-axially-movable tools; a work table; a motor comprising a housing and a drive shaft; a base element adapted to be permanently attached to the motor housing; a tool spindle head connected to the base element by a hinge construction on which the spindle head is movable toward and from the motor shaft, and comprising a manually axially removable hinge pintle pin for detaching the spindle head from the base element; a tool spindle supported by the spindle head and rotatable on an axis parallel to the drive shaft; a belt pulley having a spline driving connection to the spindle; a belt pulley on the motor shaft; a belt connecting the pulleys; means to adjust the belt tension comprising manually operable means independent of said hinge coacting with the base element and spindle head, to lock the spindle head in hinged positions thereof; manually operable means for reciprocating the tool spindle axially while being rotatably driven through the spline connection; manually operable holding means for optionally holding the spindle against axial movement in selected axially moved positions thereof; supporting means for the motor housing supporting it above the table, and on which it may be manually rocked to position the tool spindle at different angles with the work table and on which it may be manually moved to dispose the tool spindle over different points of the work table; and means on the tool spindle for holding rotary-and-axially-movable tools.

3. In a machine for driving rotary-and-axially-movable tools; a work table; a tool spindle carrier rotatably supporting a tool spindle; a support for the carrier above the work table, comprising means on which the carrier may be adjustably rocked to angularly position the spindle with respect to the work table; a stop on the carrier engageable with a portion of the support to position the carrier at a predetermined spindle angle upon rocking the carrier in one direction; and the stop being movable to a position of non-engagement with the said portion of the support.

4. In a motor driven machine tool; a motor having a housing; a spindle head rotatably supporting a tool spindle; power transmitting means operatively connecting said motor and said spindle; cooperating means on said housing and said head providing a hinge for connecting said head and said housing, said hinge being adapted to permit relative movement of said spindle and said housing for adjusting said power transmitting means; and cooperating means independent of the hinge and having respective elements on said housing and said head rigidly clampingly engaged for positively locking said head in a predetermined position relative to said housing.

5. In a machine tool; a motor having a housing; a spindle head rotatably supporting a tool spindle; power transmitting means between said motor and said tool spindle; a hinge connecting said head and said housing and adapted to permit movement of said head toward and away from said housing for adjusting said power transmitting means; a pin swingably mounted on said housing; and clamping means on said head engageable with said pin for locking said head in a predetermined angular position with respect to said motor.

6. In a motor driven machine tool; a motor having a housing; a spindle head rotatably supporting a tool spindle; power transmitting means operatively connecting said motor and said spindle; means for removably supporting said head on said housing and adapted to permit movement of said spindle head toward and away from said housing for adjusting said power transmitting means; and means remote from said head supporting means and having respective elements on said housing and said head for positively locking said head in a predetermined position relative to said housing.

7. In a motor driven machine tool; a motor having a housing; a spindle head rotatably supporting a tool spindle; a belt type power transmitting means operatively connecting said motor and said spindle; a hinge connection for supporting said head on said housing, said hinge being adapted to permit movement of said spindle toward and away from said housing for tensioning said power transmitting means; and means independent of said hinge and having a rigid head supported element, a rigid housing supported element and a releasable clamp connection connecting said elements with each other between the housing and head to lock said head in a predetermined position relative to said housing and to divide the stresses due to the driving forces of said power transmitting means between said hinge connection and said lock means.

8. In a machine tool; a tool spindle carrier rotatably supporting a tool; a mount for said carrier for supporting said carrier above a work table, journalling means in said mount receiving said carrier and supporting said carrier for angular displacement of said carrier and said tool with respect to said mount and said work table; and a stop pivotally supported on said carrier to swing from an inoperative position to a normally operative position to engage a stationary portion of said mount only at a predetermined angular position of said carrier to arrest movement of said carrier when the axis of said tool reaches a position perpendicular to said work table.

J. EVERETTE TOMPKINS.

REFERENCES CITED

The following references are of record in the file of this patent:

UNITED STATES PATENTS

| Number    | Name     | Date          |
|-----------|----------|---------------|
| 1,397,696 | Nelson   | Nov. 22, 1921 |
| 1,618,341 | Howland  | Feb. 22, 1927 |
| 1,956,835 | Roemer   | May 1, 1934   |
| 1,968,362 | West     | July 31, 1934 |
| 2,258,828 | Trebert  | Oct. 14, 1941 |
| 2,312,356 | Ocenasek | Mar. 2, 1943  |
| 2,343,243 | Roemer   | Mar. 7, 1944  |
| 2,356,610 | Penney   | Aug. 22, 1944 |
| 2,364,475 | Roemer   | Dec. 5, 1944  |

FOREIGN PATENTS

| Number  | Country       | Date          |
|---------|---------------|---------------|
| 542,807 | Great Britain | Jan. 28, 1942 |

OTHER REFERENCES

"Multiplex-30A" Circular made by Red Star Products, Inc., of Cleveland, Ohio.